United States Patent
Tunick et al.

(10) Patent No.: US 7,634,393 B1
(45) Date of Patent: Dec. 15, 2009

(54) TECHNIQUE FOR COUPLING METEOROLOGY TO ACOUSTICS IN FORESTS

(75) Inventors: Arnold D. Tunick, Baltimore, MD (US); Ronald E. Meyers, Columbia, MD (US); Keith S. Deacon, Columbia, MD (US)

(73) Assignee: United States of America, Washington, DC (US)

(*) Notice: Subject to any disclaimer, the term of this patent is extended or adjusted under 35 U.S.C. 154(b) by 747 days.

(21) Appl. No.: 11/326,686

(22) Filed: Dec. 29, 2005

Related U.S. Application Data

(60) Provisional application No. 60/641,298, filed on Jan. 4, 2005.

(51) Int. Cl.
G06F 7/60 (2006.01)
G06G 7/56 (2006.01)
(52) U.S. Cl. .............................................. 703/5; 703/2
(58) Field of Classification Search ...................... 703/2, 703/5
See application file for complete search history.

(56) References Cited

U.S. PATENT DOCUMENTS 4,678,330 A * 7/1987 Gutschick et al. ........... 356/222

OTHER PUBLICATIONS

Campbell, G. et al., "An Introduction to Environmental Biophysics," Second Edition, Springer, 1998, 22 pages.
Campbell, G., "An Introduction to Environmental Biophysics," Springer-Verlag, 1986, 12 pages.
Kaimal, J. et al., "Atmospheric Boundary Layer flows—Their Structure and Measurement," Oxford University Press, 1994, 10 pages.
Garratt, J., "The Atmospheric Boundary Layer," Cambridge University Press, 1992, 12 pages.
Munn, R., "Descriptive Micrometeorology," Academic Press, 1966, 2 pages.
Busch, N., "On the Mechanics of Atmospheric Turbulence," Workshop on Micrometeorology, American Meteorological Society, 1973, 14 pages.
Wyngaard, J., "On surface-Layer Turbulence," Workshop on Micrometeorology, American Meteorological Society, 1973, 5 pages.
Donaldson, C., "Construction of a Dynamic Model of the Production of Atmospheric Turbulence and the Dispersal of Atmospheric Pollutants," Workshop on Micrometeorology, American Meteorological Society, 1973, 20 pages.
Srour, N., "Army Acoustics Needs DARPA Air-Coupled Acoustic Micro Sensors Workshop," U.S. Army Research Laboratory, Aug. 25, 1999, 15 pages.

(Continued)

*Primary Examiner*—Paul L Rodriguez
*Assistant Examiner*—Nithya Janakiraman
(74) *Attorney, Agent, or Firm*—Edward L. Stolarun; Lawrence E. Anderson

(57) ABSTRACT

A system and method of predicting multi-dimensional meteorological and acoustic effects within and above a forest environment comprises collecting input data comprising meteorological and forest canopy characterization data for a specified forest environment; inputting the input data into program meteorology modules comprising an embedded radiative transfer and energy budget methodology module adapted to predict a heat source within and above the forest environment for any location at any time; calculating an incoming total radiation at a top of the forest environment; outputting multi-dimensional acoustics and meteorology numerical codes based on the program meteorology modules and the calculated total radiation; and formulating sound speeds within and above the forest environment based on the numerical codes.

21 Claims, 21 Drawing Sheets

OTHER PUBLICATIONS

Wilson, D., "A Prototype Acoustic Battlefield Decision Aid Incorporating Atmospheric Effects and Arbitrary Sensor Layouts," Army Research Laboratory, ARL-TR-1708, Sep. 1998, pp. 1-61.

Fong, M. et al., "Cueing of the Surrogate Remote Sentry Using an Acoustic Detection System," Army Research Laboratory, ARL-TR-795, Nov. 1995, pp. 1-17.

Melloh, R. et al., "Forest Characterization Blossom Point Military Installation near LaPlata, Maryland," Draft 9 Apr. 2004, 17 pages.

Tunick, A., "Coupling Meteorology to Acoustics in Forests," Army Research Laboratory, ARL-MR-538, Sep. 2002, pp. 1-41.

Patton, E., "Large-Eddy Simulation of Turbulent Flow Above and Within a Plant Canopy," Partial Dissertation for Doctor of Philosophy in Atmospheric Science in the Office of Graduate Studies of the University of California Davis, 1997, 20 pages.

Rachele, H. et al., "Energy Balance Model for Imagery and Electromagnetic Propagation," Journal of Applied Meteorology, vol. 33, Aug. 1994, pp. 964-976.

Shinn, J., "Steady-State Two-Dimensional Air Flow in Forests and the Disturbance of Surface Layer Flow by a Forest Wall," ECOM, U.S. Army Electronics Command, May 1971, 17 pages.

Tunick, A., "Calculating the Micrometeorological Influences on the Speed of Sound Through the Atmosphere in Forests," J. Acoust. Soc. Am. 114 (4), Pt. 1, Oct. 2003, pp. 1796-1806.

Massman, W., "Foliage Distribution in Old-Growth Coniferous Tree Canopies," Canadian Journal of Forest Research, vol. 12, No. 1, 1982, pp. 10-17.

Katul, G. et al., "An Investigation of Higher-Order Closure Models for a Forested Canopy," Boundary-Layer Meteorology, 89, 1998, pp. 47-74.

Meyers, T. et al., "A Multilayer Model for Inferring Dry Deposition Using Standard Meteorological Measurements," Journal of Geophysical Research, vol. 103, No. D17, Sep. 20, 1998, pp. 22,645-22,661.

Meyers, T. et al., "Modelling the Plant Canopy Micrometeorology with Higher-Order Closure Principles," Agricultural and Forest Meteorology, 41, 1987, pp. 143-163.

Pyles, R. et al., "The UCD Advanced Canopy-Atmosphere-Soil Algorithm: Comparisons with Observations from Different Climate and Vegetation Regimes," Q.J..R. Meteorol. Soc., 126, 2000, pp. 2951-2980.

Wilson, J. et al., "A First-order Closure for Disturbed Plant-Canopy Flows, and its Application to Winds in a Canopy on a Ridge," Q.J.R. Meteorol. Soc., 124, 1998, pp. 705-732.

Li, Z. et al., "Air Flow Over and Through a Forest Edge: A Steady-State Numerical Simulation," Boundary-Layer Meteorology, 51, 1990, pp. 179-197.

Wilson, N. et al., "A Higher Order Closure Model for Canopy Flow," Journal of Applied Meteorology, vol. 16, Nov. 1977, pp. 1197-1205.

Shaw, R. et al., "Large-Eddy Simulation of Turbulent Flow Above and Within a Forest," Boundary-Layer Meteorology, 61, 1992, pp. 47-64.

Mellor, G. et al., "A Hierarchy of Turbulence Closure Models for Planetary Boundary Layers," Journal of the Atmospheric Sciences, vol. 31, Oct. 1974, pp. 1791-1806.

Mellor, G., "Analytic Prediction of the Properties of Stratified Planetary Surface Layers," Journal of the Atmospheric Sciences, vol. 30, Sep. 1973, pp. 1061-1069.

Mellor, G. et al., "Development of a Turbulence Closure Model for Geophysical Fluid Problems," Reviews of Geophysics and Space Physics, vol. 20, No. 4, Nov. 1982, pp. 851-875.

Paw, U. et al., "Theoretical and Measured Evaporation Rates From an Exposed Piche Atmograph," Agricultural Meteorology, 30, 1983, pp. 1-11.

Shaw, R., "Secondary Wind Speed Maxima Inside Plant Canopies," Journal of Applied Meteorology, vol. 1, May 1977, pp. 514-521.

Albertson, J. et al., "Relative Importance of Local and Regional Controls on Coupled Water, Carbon, and Energy Fluxes," Advances in Water Resources, 24, 2001, pp. 1103-1118.

Albini, F., "A Phenomenological Model for Wind Speed and Shear Stress Profiles in Vegetation Cover Layers," Journal of Applied Meteorology, vol. 20, Nov. 1981, pp. 1325-1335.

Inoue, E., "On the Turbulent Structure of Airflow Within Crop Canopies," Journal Met. Soc. Japan, vol. 41, No. 6, 1963, pp. 317-326.

Finnigan, J. et al., "Turbulent Airflow in Forests on Flat and Hilly Terrain," Winds and Trees, Cambridge University Press, 1995, pp. 3-40.

Price, M. et al., "Sound Attenuation Through Trees: Measurements and Models," J. Acoust. Soc. Am 84 (5), Nov. 1988, pp. 1836-1844.

Wilson, J., "A Second-Order Closure Model For Flow Through Vegetation," Boundary-Layer Meteorology, 42, 1988, pp. 371-392.

Fricke, F., "Sound Attenuation in Forests," Journal of Sound and Vibration, 92 (1), 1984, pp. 149-158.

Huisman, W. et al, "Reverberation and Attenuation in a Pine Forest," J. Acoust. Soc. Am., 90 (5), Nov. 1991, pp. 2664-2677.

Wong, G. et al., "Variation of Specific Heats and of Specific Heat Ratio in Air With Humidity," J. Acoust. Soc. Am., 76 (2), Aug. 1984, pp. 555-559.

Weiss, A. et al., "Partitioning Solar Radiation Into Direct and Diffuse, Visible and Near-Infrared Components," Agricultural and Forest Meteorology, 34, 1985, pp. 205-213.

Tunick, A., "Coupling Meteorology to Acoustic in Forests," In proceedings of the 23rd Army Science Conference, sponsored by the Assistant Secretary of the Army (Acquisition, Logistics and Technology), Dec. 2-5, 2002, Orlando, FL, 8 pages.

Tunick, A., "A Two-Dimensional Meteorological Computer Model for the Forest Canopy," ARL-MR-569, Aug. 2003, pp. 1-22.

* cited by examiner

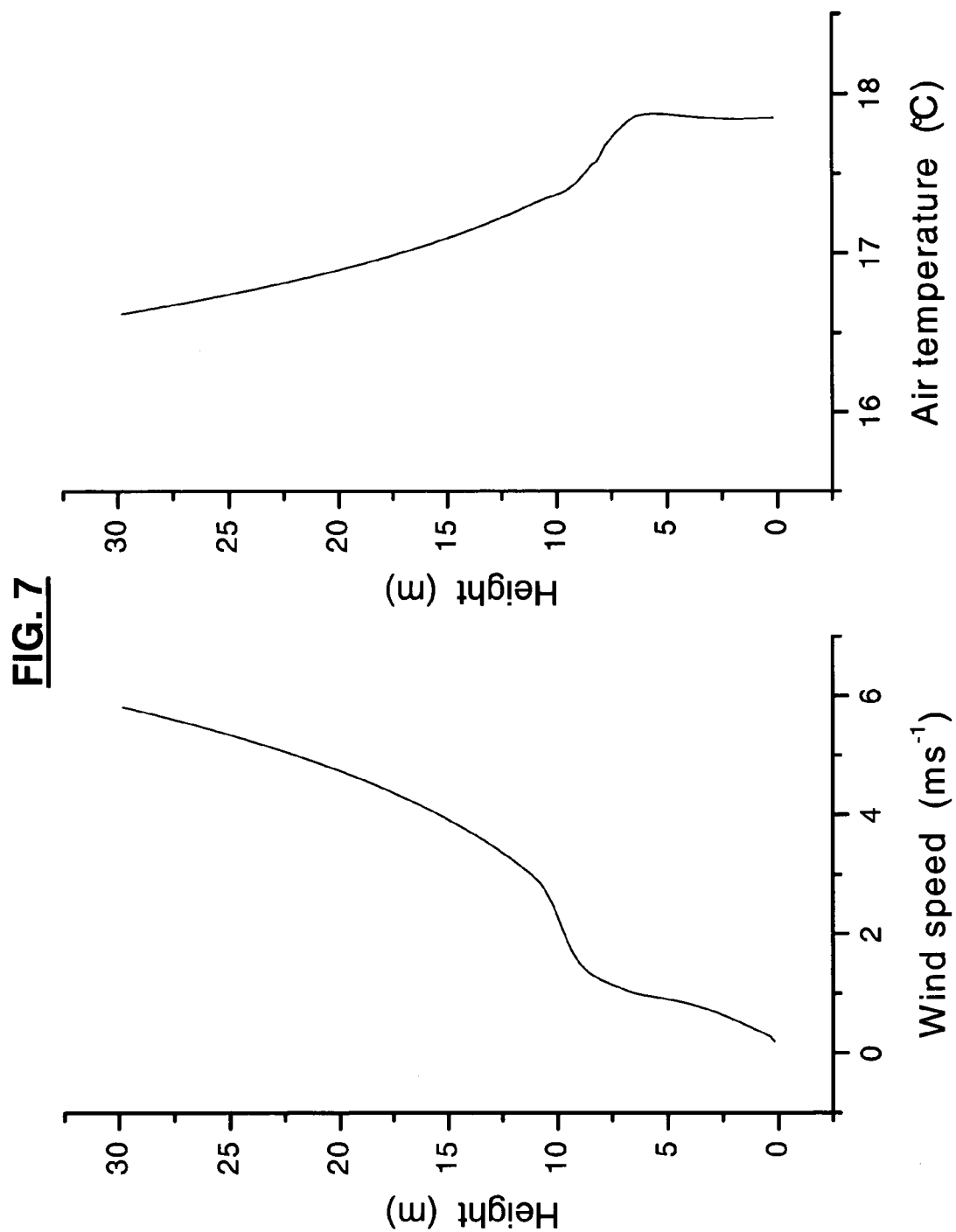

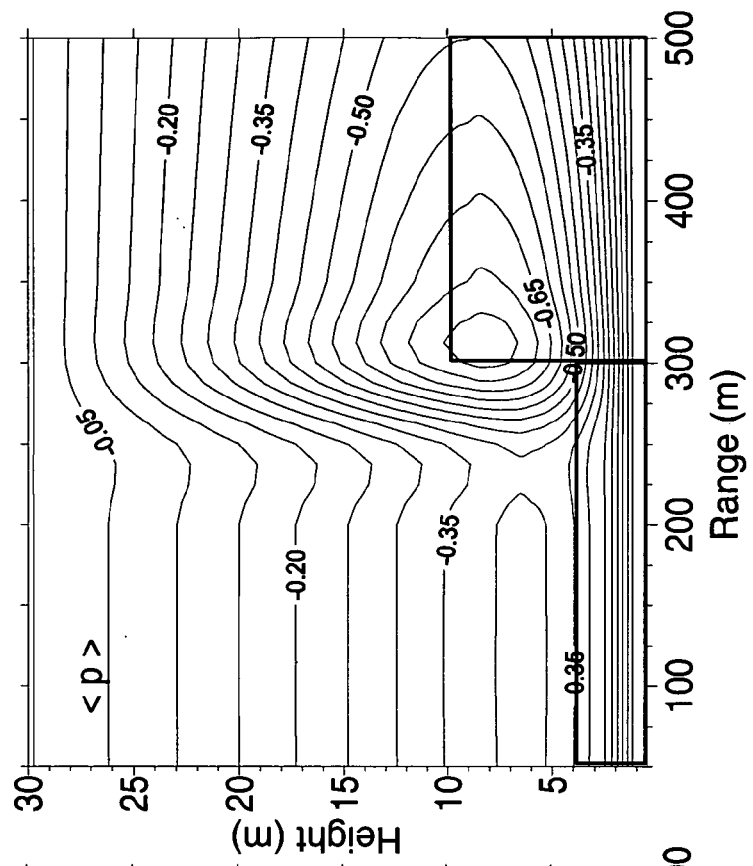
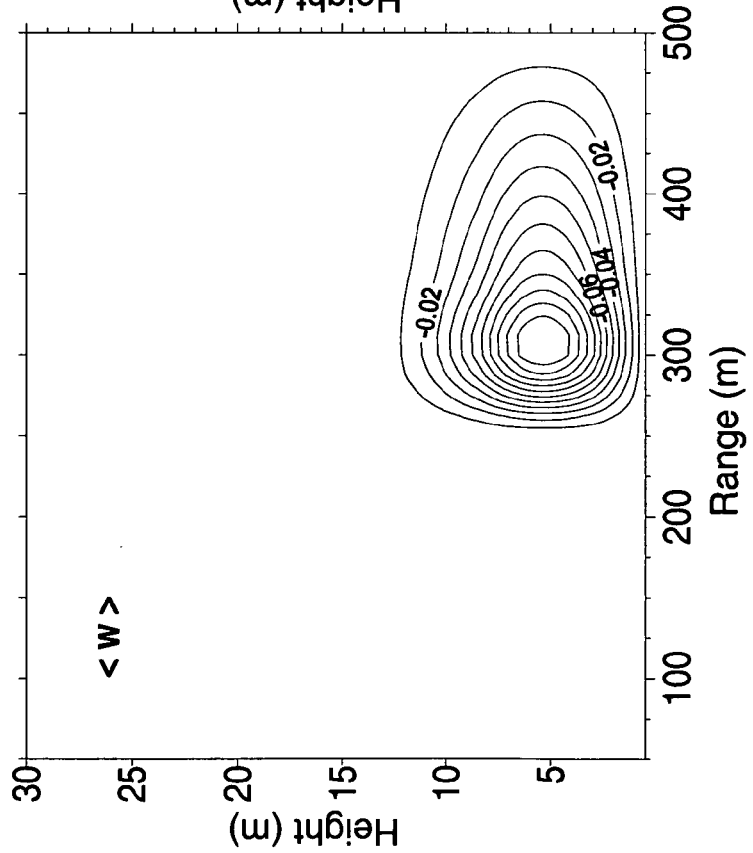
FIG. 9(B)
FIG. 9(A)

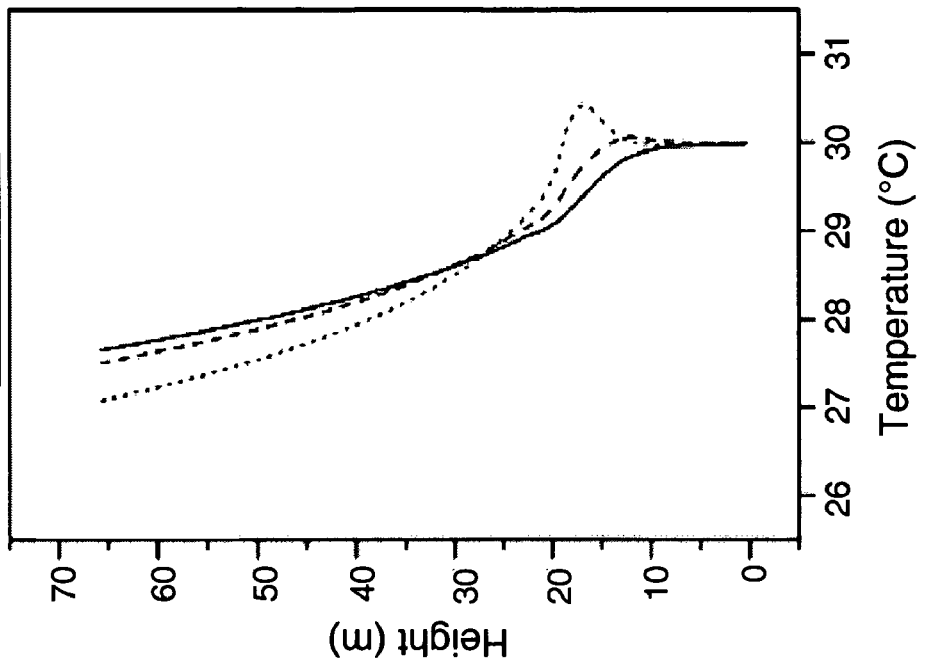
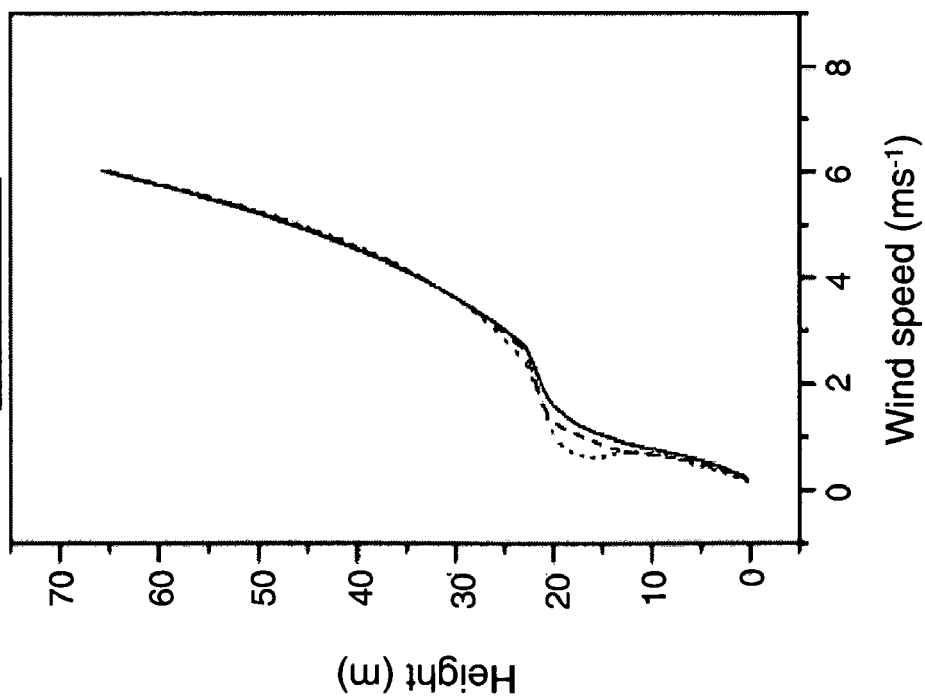
FIG. 12(A)
FIG. 12(B)

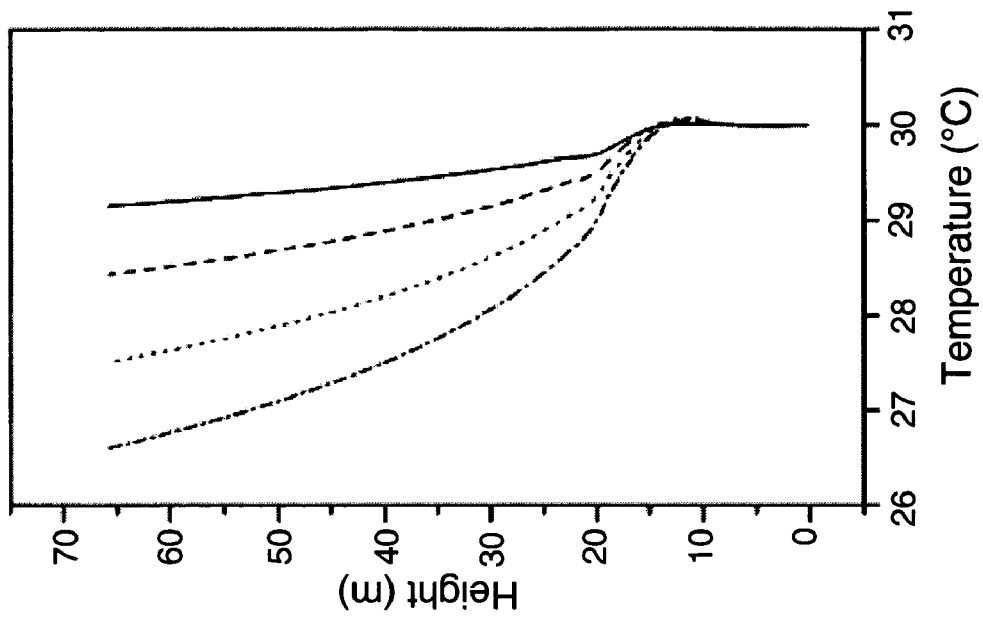
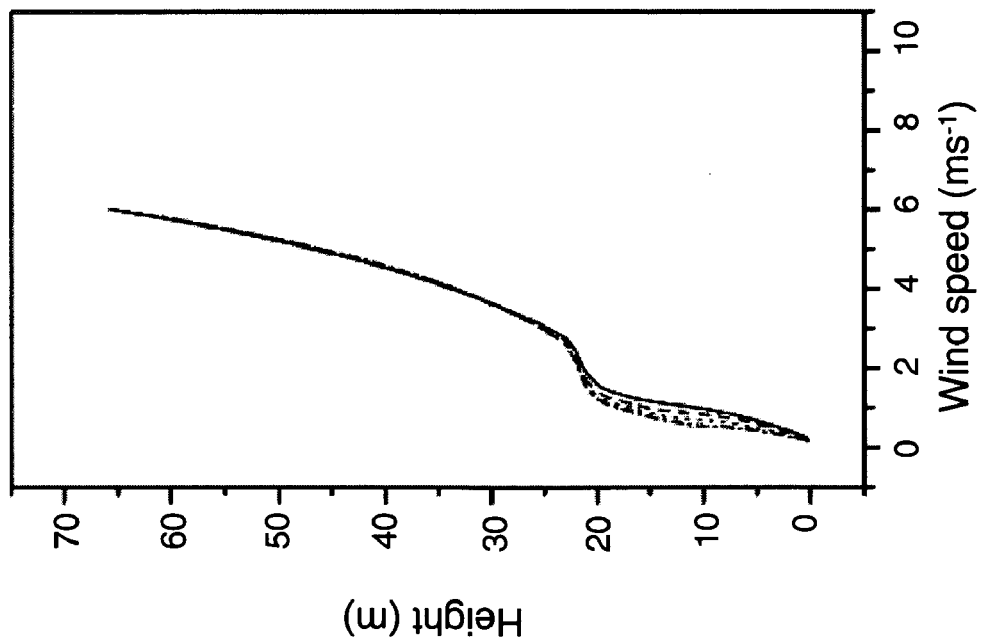

TECHNIQUE FOR COUPLING METEOROLOGY TO ACOUSTICS IN FORESTS

CROSS-REFERENCE TO RELATED APPLICATIONS

This application claims the benefit of U.S. Provisional Patent Application No. 60/641,298 filed Jan. 4, 2005, the complete disclosure of which, in its entirety, is herein incorporated by reference.

GOVERNMENT INTEREST

The embodiments described herein may be manufactured, used, and/or licensed by or for the United States Government without the payment of royalties thereon.

A portion of the disclosure of this patent document, as provided in the Appendix herein, includes material that is subject to copyright protection. The copyright owner has no objection to the facsimile reproduction by anyone of this patent document or the patent disclosure, as it appears in the U.S. Patent and Trademark Office patent file or records, but otherwise reserves all copyright rights whatsoever.

BACKGROUND

1. Field of the Invention

The embodiments herein generally relate to numerical methods, and, more particularly, to numerical methods for forest meteorology and acoustic computations and applications.

2. Description of the Related Art

Acoustic sensors are emerging as a key technology for providing battlefield situational awareness necessary to protect ground combat troops. Advantages of acoustic sensors include low cost, compactness, passive operation, low power consumption, and non-line-of-sight capability. Many new systems use acoustical arrays to detect, classify, estimate bearing, and cue narrow field-of-view (FOV) optics. Some new systems use multiple, networked arrays to track targets by bearing estimation and triangulation. At the same time, acoustic sensor performance is strongly affected by the atmospheric environment. It is anticipated therefore, that improved physics-based theory and computer models for meteorology coupled to acoustics (in and around forests) will contribute important information on the performance of advanced combat sensors, systems, and communications as well as the effectiveness of battlefield computer aids to increase situational awareness.

Some of the conventional techniques related to numerical models for forest meteorology include exponential or extinction profile models, which are formulated to predict one-dimensional (1D) wind speeds primarily in the mid-to-upper portion of the forest canopy. Unfortunately, these exponential or extinction profile models tend to be difficult to combine to observed or estimated wind speeds above the treetops or below the layer of leaves and branches. In addition, extinction profile models are typically not formulated to predict temperatures within and above forests, which are needed to compute sound speed.

Prior art related to the development of numerical model codes for forest meteorology were generally formulated to predict one-dimensional wind speeds and turbulence within and above uniform forest canopies. In these models, radiation and energy budget algorithms were not included to predict the heat source (temperatures and sound speed). In contrast, the three-dimensional Large Eddy Simulation (LES) model described by Albertson et al., "Relative Importance of Local and Regional Controls on Coupled Water," (2001), did consider energy budget effects, however, this as well as other LES models are quite computationally intensive and are not within a computational framework that is most efficient for a rapid and reliable prediction of acoustic propagation in forest environments. In one further case, the prior art, as described by Meyers and Paw U, "Modeling the Plant Canopy Micrometeorology with Higher Order Closure Principles," Agric. For. Meteorol., Agric. For Meteorol., 41, 143-63 (1987) and Pyles et al., "The UCD Advanced Canopy-Atmosphere-soil Algorithm:

Comparisons with Observations from Different Climate and Vegetation Regimes," Q. J. Roy. Met. Soc. 126 2951-2980 (2000), are also quite computationally intensive. In general, their models offer much more information related to soil and plant physics than is necessary for the rapid and reliable prediction of sound speed in forests. These models, however, have been applied for the study of carbon dioxide and other trace gas emissions, which have a significant impact on large scale climate.

Prior art related to ray path model codes for acoustic propagation and transmission loss generally assume homogeneous sound and wind speed fields (e.g., Moler CB and Solomon LP, "Use of splines and numerical integration in geometrical acoustics." J Acoust Soc Am 48: 739-744, 1970; Hallberg B, Larsson C and Israelsson S "Numerical ray tracing in the atmospheric surface layer" J Acoust Soc Am 83: 2059-2068, 1988; Huisman W H T "Sound propagation over vegetation-covered ground," Dissertation, Univ. Nijmegen, The Netherlands, 176 pp., ISBN 90-9003624-5 (1990), Huisman W H T and Attenborough K "Reverberation and attenuation in a pine forest," J Acoust Soc Am 90: 2664-2677 (1991), and Salomons E M "Computational atmospheric acoustics," Kluwer Academic Publishers, Dordrecht, 335 pp 2001). The advantage of the invention described herein is that the acoustic models are based on the principles and theory for geometrical acoustics for an inhomogeneous moving medium. Ray paths are thus computed as a function of range dependent wind and sound speed fields. These data are provided independently from 1D and 2D, physics-based, meteorological model for forests (Tunick A (2003a) "Calculating the micrometeorological influences on the speed of sound through the atmosphere in forests," J Acoust Soc Am 114: 1796-1806, Tunick, A. (2003b) A two-dimensional meteorological computer model for the forest canopy. ARL-MR-569, US Army Research Laboratory, 2800 Powder Mill Rd, Adelphi, Md. 20783-1197, (2003), Tunick, A. (2004a): Toward improving the efficiency and realism of coupled meteorological-acoustic computer models for the forest canopy. ARL-MR-586, April, U.S. Army Research Laboratory, 2004). In addition, acoustic intensity due to geometrical divergence (i.e., energy loss due to spherical spreading) is computed as an inverse function of range and the height difference between two adjacent rays. At the same time, acoustic intensity gain (or loss) due to frequency-dependent ground effects are included in the model calculation. Note that while the acoustic numerical models embedded in this invention are much simpler than parabolic equation or fast field acoustic programs (West et al., 1991, 1992; Noble J M (2003) User's manual for the Microsoft window edition of the scanning fast-field program (SCAFFIP) version 3.0. ARL-TR-2696, US Army Research Laboratory, 2800 Powder Mill Rd, Adelphi, Md. 20783-1197. [Available from the DTIC at http://stinet.dtic.mil/str/]), ray path models have nevertheless been shown to be a practical and useful tool for analyzing and interpreting refraction effects on sound waves.

Other conventional models include first-order closure, physics-based models, which are formulated to predict two-dimensional (2D) wind speeds and turbulence within and above forest canopies. Here, radiation and energy budget methodologies are generally not included to predict the heat source (temperatures and sound speed). Additionally, second-order closure, physics-based models have been developed to predict one-dimensional (1D) wind speeds and turbulence within and above forest canopies. Again, radiation and energy budget methodologies are not included to predict the heat source (temperatures and sound speed). Furthermore, higher-order closure, physics-based models such as three-dimensional (3D) Large Eddy Simulation (LES) models have been formulated to predict 3D wind speeds, temperatures, humidity, and turbulence within and above forest canopies. Here, radiation and energy budget algorithms are sometimes incorporated to predict the heat and moisture sources. However, these models tend to be quite computationally intensive, especially with regard to turbulence and advection scheme methodologies. Also, they can offer much more information related to soil and plant physics than is necessary for the rapid and reliable prediction of sound speed in and around forest canopies.

Conventional techniques related to ray path model codes for acoustic propagation and transmission loss generally assume homogeneous sound and wind speed fields. However, forest stands are typically inhomogeneous, containing non-uniform distributions of canopy height and leaf area density. In addition, open fields, roadways, and buildings often border forests. Generally, the conventional techniques primarily show the development of forest canopy wind flow and turbulence models only. However, there remains a need for a forest meteorology and acoustic computation technique that takes into account horizontally non-uniform sound speed information.

Furthermore, an advantage of this invention over the prior art is that it combines the inventors' existing numerical models developed in accordance with the invention and those still in development into a comprehensive process, which includes input, memory and computing devices, numerical codes, and graphics display. The invention necessarily addresses both the thermodynamic and mechanical influences on sound speed within and above forest canopies. Numerical models are executed in a computationally efficient framework. Hence, the invention is a novel process to obtain rapid and reliable predictions of useful acoustic and meteorological information, which can be applied to the study of meteorological aspects of acoustic propagation within and above forests.

SUMMARY

In view of the foregoing, the embodiments herein provide a method of predicting multi-dimensional meteorological and acoustic effects within and above a forest environment, and a program storage device readable by computer, tangibly embodying a program of instructions executable by the computer to perform a method of predicting multi-dimensional meteorological and acoustic effects within and above a forest environment, wherein the method comprises collecting input data comprising meteorological and forest canopy characterization data for a specified forest environment; inputting the input data into program meteorology modules comprising an embedded radiative transfer and energy budget methodology module adapted to predict a heat source within and above the forest environment for any location at any time; calculating an incoming total radiation at a top of the forest environment; outputting multi-dimensional acoustics and meteorology numerical codes based on the program meteorology modules and the calculated total radiation; and formulating sound speeds within and above the forest environment based on the numerical codes. Preferably, the input data further comprises site location data, cloud cover data, wind speed data, temperature data, humidity data, time of day data, day of year characteristics data, and environment characterization data for the forest environment.

Additionally, the environment characterization data preferably comprises tree height data, leaf area density data, and drag coefficient data affecting the forest environment. Moreover, the embedded radiative transfer and energy budget methodology preferably predicts a heat source within and above the forest environment. Preferably, the calculating of the incoming total radiation at the top of the forest environment allows for calculations of a transmission, reflection, absorption, and emission of a solar flux within the forest environment. Also, the program meteorology modules may comprise acoustic transmission loss modules, acoustic ray path modules, one-dimensional meteorological modules for the forest environments, and two-dimensional meteorological modules for forest environments. Preferably, the two-dimensional meteorological modules for the forest environments comprises variable grid modules, and wherein the method further comprises applying the variable grid modules to the acoustic transmission loss modules and the acoustic ray path modules.

The invention described herein is a method that inputs readily available meteorological and forest characterization data to a computer. On the computer reside numerical model codes for acoustics and meteorology within and above forests. The embodiments for meteorology are steady-state, second-order turbulence closure models, with an embedded radiative transfer and energy budget algorithm to predict the heat source for any location at any time of day. Formulations co-developed by the inventors are used to calculate the incoming total radiation at the canopy top, which is necessary in order to calculate the transmission, reflection, absorption, and emission of the solar flux through the forest. The computer then executes meteorological and acoustics numerical models and provides as output (to a graphics display device) a rapid and reliable prediction of sound speed and transmission loss information in uniform and complex wooded areas. FIG. 1 presents a schematic of the process.

A key element in determining point-to-point acoustic transmission in forests is modeling the variation (with height above ground) of the wind and sound speed. Sound speed is readily derived from estimates of air temperature and relative humidity (albeit, variations in sound speed caused by changes in relative humidity are comparatively small). The invention discussed herein is a method that uses meteorological and acoustics numerical models embedded into a computing device to predict and graphically display rapid and reliable meteorology and acoustic transmission loss information within and above forest canopies. This process can be important in assessing the performance of advanced acoustic sensors and communications as well as determining the effectiveness of battlefield computer aids to increase situational awareness. Potential uses include studying the effects of forest meteorology on sound blast propagation for noise abatement studies at military training sites. The invention may also be utilized by the EPA in noise abatement studies; i.e., investigating the effectiveness of forests to reduce traffic and/or airport noise and the like.

Another embodiment provides a system of predicting multi-dimensional meteorological and acoustic effects within and above a forest environment, wherein the system comprises a computer memory device comprising input data corresponding to meteorological and forest canopy characterization data for a specified forest environment; a processor operatively connected to the computer memory device, wherein the processor is adapted to input the input data into program meteorology modules comprising an embedded radiative transfer and energy budget methodology module to predict a heat source within and above the forest environment for any location at any time; a calculating device operatively connected to the processor, wherein the calculating device is adapted to calculate an incoming total radiation at a top of the forest environment; a computing device operatively connected to the calculating device, wherein the computing device is adapted to output multi-dimensional acoustics and meteorology numerical codes based on the program meteorology modules and the calculated total radiation; and formulate sound speeds within and above the forest environment based on the numerical codes; and a graphic user interface operatively connected to the computing device, wherein the graphic user interface is adapted to display the acoustic speeds within and above the forest environment. Preferably, the input data further comprises site location data, cloud cover data, wind speed data, temperature data, humidity data, time of day data, day of year characteristics data, and environment characterization data for the forest environment.

Additionally, the environment characterization data preferably comprises tree height data, leaf area density data, and drag coefficient data affecting the forest environment. Moreover, the embedded radiative transfer and energy budget methodology module is preferably adapted to predict a heat source within and above the forest environment. Furthermore, the calculating device is preferably adapted to calculate a transmission, reflection, absorption, and emission of a solar flux within the forest environment. Also, the program meteorology modules may comprise acoustic transmission loss modules, acoustic ray path modules, one-dimensional meteorological modules for forest environments, and two-dimensional meteorological modules for forest environments. Preferably, the two-dimensional meteorological modules for the forest environment comprises variable grid modules, and wherein the program meteorology modules further comprise program modules adapted to apply the variable grid modules to the acoustic transmission loss modules and the acoustic ray path modules.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 7 is a graphical representation illustrating modeled profiles of the mean wind and air temperature inside and above a uniform forest canopy for typical (warm) daytime unstable conditions according to an embodiment herein;

FIG. 9(A) is a graphical representation illustrating 2D model results of vertical wind velocity, $\langle \bar{w} \rangle$, in units $ms^{-1}$, for non-uniform forest stands according to an embodiment herein;

FIG. 9(B) is a graphical representation illustrating 2D model results of kinematic (fluctuation) pressure, $\langle \bar{p} \rangle$, in units $m^{-2}s^{-2}$, for non-uniform forest stands according to an embodiment herein;

FIG. 12(A) is a graphical representation illustrating modeled profiles of mean wind speed inside and above the forest canopy for the three cases in Experiment #1 according to an embodiment herein;

FIG. 12(B) is a graphical representation illustrating modeled profiles of air temperature inside and above the forest canopy for the three cases in Experiment #1 according to an embodiment herein;

FIG. 18(A) is a graphical representation illustrating modeled profiles of mean wind speed inside and above the forest canopy for the three cases in Experiment #3 according to an embodiment herein;

FIG. 18(B) is a graphical representation illustrating modeled profiles of mean air temperature inside and above the forest canopy for the three cases in Experiment #3 according to an embodiment herein;

DETAILED DESCRIPTION OF PREFERRED EMBODIMENTS

Figure 1:
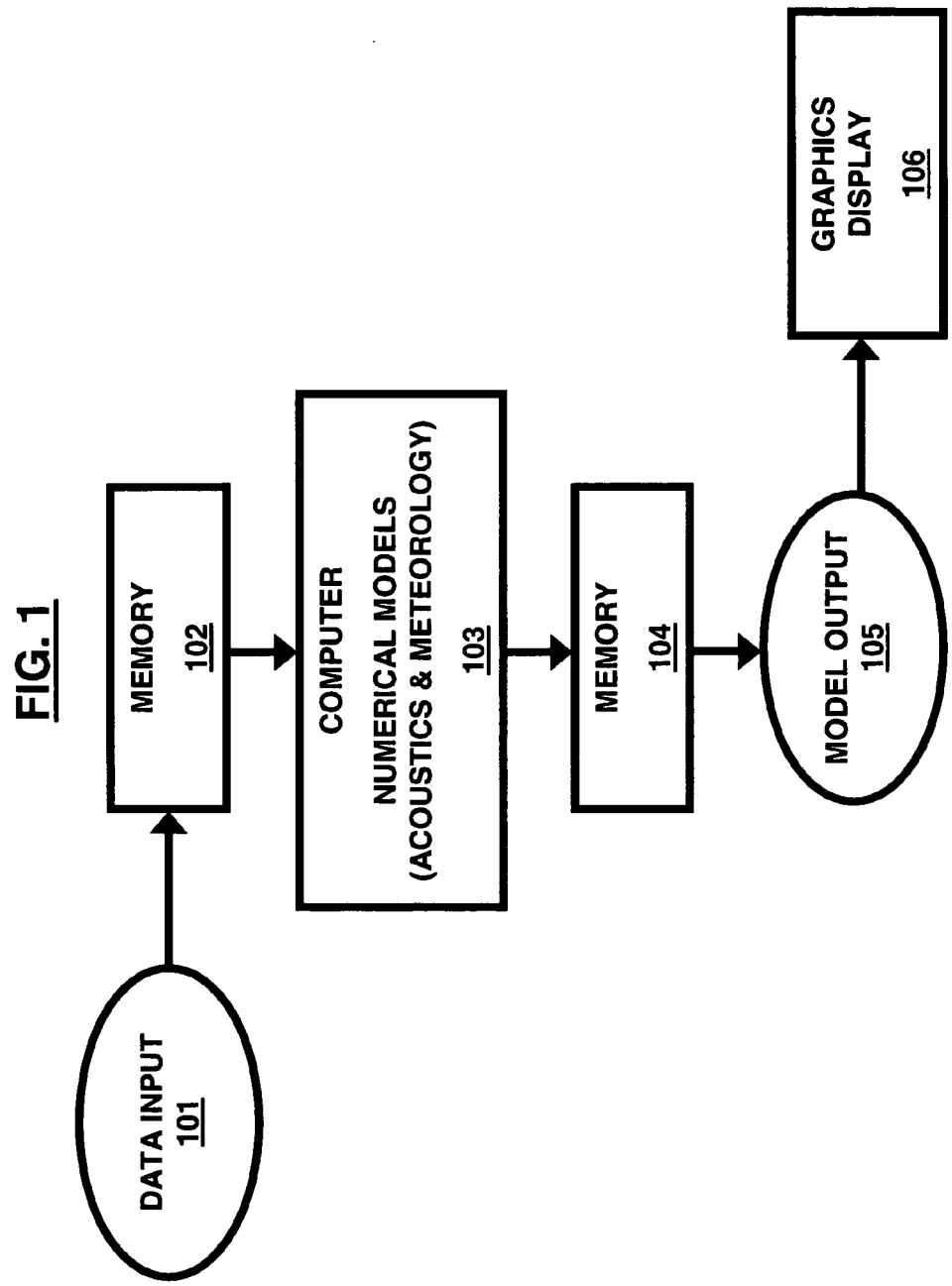
FIG. 1 illustrates a system block diagram illustrating a preferred process flow according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In a previous study (Tunick, 2003a), it was found that a useful mathematical representation of the wind flow, temperatures, and turbulence inside and above a uniform, continuous forest stand could be obtained by means of a one-dimensional (1-D), steady-state, second-order turbulence closure model, with an embedded radiative transfer and energy budget algorithm to predict the heat source. Development of this 1-D model made it possible to generate realistic profiles for the winds and sound speed inside and above a forest canopy. As a result, it was shown that acoustic transmission loss and ducting of acoustic waves in and around forests is significantly influenced by local meteorological profile structure.

However, forest stands are typically inhomogeneous, containing non-uniform distributions of canopy height and leaf area density (e.g., Albertson et al., 2001). In addition, open fields, roadways, and buildings often border forests. Hence, to begin to address non-uniform forests and forest edges, Tunick (2003b) expanded the earlier 1-D equation set and developed a new model to calculate calculate the 2-D, steady state, canopy wind flow, temperatures, turbulent variances, Reynolds stress, and heat flux. In the 2-D model, a set of simultaneous, second-order, ordinary differential equations for each of eleven computed variables is solved iteratively using the Thomas algorithm, a tri-diagonal matrix solver (Press et al., 1992). The computed variables now include the mean flow—vertical w. Additionally, kinematic (fluctuation) pressure p is determined by taking the divergence of the mean flow equations, which, after some rearranging and cancellation of terms due to continuity, yields Poisson's equation for pressure-velocity coupling (Ferziger and Perić, 2002). Vertical derivatives are solved by central differencing and horizontal derivatives are solved by upwind differencing. Finally, Newton-Cotes formulas for numerical integration are applied to derive wind flow streamlines.

As mentioned, there remains a need for a forest meteorology and acoustic computation technique that takes into account horizontally non-uniform sound speed information. The embodiments herein achieve this by providing a physics-based computerized technique to calculate one- and two-dimensional forest canopy meteorology and turbulence for acoustic application research that considers both the mechanical and thermodynamic influences on the speed of sound in a forest environment, which can be applied in stable, unstable, and neutral atmospheric conditions. Referring now to the drawings, and more particularly to FIGS. 1 through 21, where similar reference characters denote corresponding features consistently throughout the figures, there are shown preferred embodiments.

An important element in determining point-to-point acoustic transmission in forests is modeling the variation (with height above ground) of the winds and sound speed. Sound speed is readily derived from estimates of air temperature and relative humidity (albeit, variations in sound speed caused by changes in relative humidity are comparatively small). A preferred embodiment herein provides a method that uses meteorological and acoustics numerical models embedded into a computing device to predict and graphically display rapid meteorology and acoustic transmission loss information within and above forest canopies.

Moreover, the embodiments herein provide a methodology to predict one-dimensional (1D) and two-dimensional (2D) wind speeds, temperatures, and turbulence within and above forest canopies. Accordingly, radiation and energy budget methodologies are incorporated to predict the heat source. In most cases, to include some LES formulations, a relatively simple extinction profile for the heat source is assumed. FIG. 1 illustrates a methodology according to an embodiment herein, where, in step 101 data is provided for input; i.e., meteorological data, cloud cover, site location, time of day, and day of year characteristics, and canopy characterization data; e.g., tree height, leaf area density information, and drag coefficient. The input data is stored in a memory device in step 102. Here, the stored input data is transferred from the memory device to a computer, on which numerical model codes for acoustics and meteorology reside. The models for meteorology are steady-state, second-order turbulence closure models, with an embedded radiative transfer and energy budget algorithm to predict the heat source for any location at any time (i.e., any time of the day or night). Formulations are used to calculate the incoming total radiation at the canopy top, which is necessary in order to calculate the transmission, reflection, absorption, and emission of the solar flux through the forest. Next, in step 103, a computing device executes numerical model codes for acoustics and meteorology and provides model output to a memory device. In steps 104 and 105 numerical model output data is stored in memory and made available for analysis and graphics display. Thereafter, in step 106 acoustic and meteorological model output is transferred to a graphics device for display, analysis, and interpretation of a rapid and reliable prediction of sound speed and transmission loss information in uniform and complex wooded areas.

Useful mathematical representations of the wind flow, temperatures, and turbulence inside and above a uniform, continuous forest stand can be obtained by means of a 1D, steady-state, second-order turbulence closure model, with an embedded radiative transfer and energy budget methodology to predict the heat source. Development of this 1D model makes it possible to generate realistic profiles for the winds and sound speed inside and above a forest canopy. As a result, it is known that the acoustic transmission loss and ducting of acoustic waves in and around forests is significantly influenced by a local meteorological profile structure.

The 1D model includes the steady state, and horizontally homogeneous conservation (simplified Navier-Stokes) equations for the turbulent fluxes and mean variances of the winds inside and above the forest canopy. The parameterized model equations for the mean flow $\langle \bar{u} \rangle$, stress $\langle \overline{u'w'} \rangle$, longitudinal $\langle \overline{u'^2} \rangle$, lateral $\langle \overline{v'^2} \rangle$, and vertical velocity $\langle \overline{w'^2} \rangle$ variances, respectively, are as follows:

$$\frac{d\langle \bar{u} \rangle}{dt} = 0 = -\frac{d\langle \overline{u'w'} \rangle}{dz} - C_d A \langle \bar{u} \rangle^2, \quad (1)$$

$$\frac{d\langle \overline{u'w'} \rangle}{dt} = 0 = -\langle \overline{w'^2} \rangle \frac{d\langle \bar{u} \rangle}{dz} + \frac{d}{dz}\left(2q\lambda_1 \frac{d\langle \overline{u'w'} \rangle}{dz}\right) + \frac{g}{\theta}\langle \overline{u'\theta'} \rangle - \frac{q}{3\lambda_2}\langle \overline{u'w'} \rangle + Cq^2 \frac{d\langle \bar{u} \rangle}{dz}, \quad (2)$$

$$\frac{d\langle \overline{u'^2} \rangle}{dt} = 0 = -\langle \overline{u'w'} \rangle \frac{d\langle \bar{u} \rangle}{dz} + \frac{d}{dz}\left(q\lambda_1 \frac{d\langle \overline{u'^2} \rangle}{dz}\right) + 2C_d A \langle \bar{u} \rangle^3 - \frac{q}{3\lambda_2}\left(\langle \overline{u'^2} \rangle - \frac{q^2}{3}\right) - \frac{2}{3}\frac{q^3}{\lambda_3}, \quad (3)$$

$$\frac{d\langle \overline{v'^2} \rangle}{dt} = 0 = \frac{d}{dz}\left(q\lambda_1 \frac{d\langle \overline{v'^2} \rangle}{dz}\right) - \frac{q}{3\lambda_2}\left(\langle \overline{v'^2} \rangle - \frac{q^2}{3}\right) - \frac{2}{3}\frac{q^3}{\lambda_3}, \text{ and} \quad (4)$$

$$\frac{d\langle \overline{w'^2} \rangle}{dt} = 0 = \frac{d}{dz}\left(3q\lambda_1 \frac{d\langle \overline{w'^2} \rangle}{dz}\right) + 2\frac{g}{\theta}\langle \overline{w'\theta'} \rangle - \frac{q}{3\lambda_2}\left(\langle \overline{w'^2} \rangle - \frac{q^2}{3}\right) - \frac{2}{3}\frac{q^3}{\lambda_3}. \quad (5)$$

Here, z is the vertical coordinate, $C_d$ (=0.15) is the forest canopy drag coefficient, A (in units $m^2 m^{-3}$) is the leaf area density, $q = \sqrt{\langle \overline{u'^2} \rangle + \langle \overline{v'^2} \rangle + \langle \overline{w'^2} \rangle}$ (in units $ms^{-1}$) is the turbulent kinetic energy of the mean flow, C is a constant whose value is approximately 0.077, g is acceleration due to gravity, θ is the ambient air potential temperature (in units K), $\langle \overline{u'\theta'} \rangle$ is the horizontal heat flux, $\langle \overline{w'\theta'} \rangle$ is the vertical heat flux, and $\lambda_1$, $\lambda_2$, and $\lambda_3$ are length scales; i.e., $\lambda_k = a_k l$, where k is an arbitrary index, and l is the mixing length. Values for these closure constants are as follows: $a_1$=0.39, $a_2$=0.85, and $a_3$=16.57. The overbars indicate a time averaged mean, whereas the brackets, $\langle \rangle$, indicate horizontal averaging. The lateral velocity variance $\langle \overline{v'^2} \rangle$ is calculated in the current 1D model to support the turbulent kinetic energy closure approximations for the triple product and dissipation terms.

Four additional conservation equations to the 1D model code are provided below. They are the equations for the mean temperature $\langle \bar{\theta} \rangle$, vertical heat flux $\langle \overline{w'\theta'} \rangle$, horizontal heat flux $\langle \overline{u'\theta'} \rangle$, and temperature variance $\langle \overline{\theta'^2} \rangle$, which can be written as follows:

$$\frac{d\langle \bar{\theta} \rangle}{dt} = 0 = -\frac{d\langle \overline{w'\theta'} \rangle}{dz} + S_\theta, \quad (6)$$

$$\frac{d\langle \overline{w'\theta'} \rangle}{dt} = \quad (7)$$

$$0 = -\langle \overline{w'^2} \rangle \frac{d\langle \bar{\theta} \rangle}{dz} + \frac{d}{dz}\left(2q\lambda_4 \frac{d\langle \overline{w'\theta'} \rangle}{dz}\right) - \frac{q}{3\lambda_5}\langle \overline{w'\theta'} \rangle + \frac{2}{3}\frac{g}{\theta}\langle \overline{\theta'^2} \rangle,$$

$$\frac{d\langle \overline{u'\theta'} \rangle}{dt} = 0 = \quad (8)$$

$$-\langle \overline{u'w'} \rangle \frac{d\langle \bar{\theta} \rangle}{dz} - \langle \overline{w'\theta'} \rangle \frac{d\langle \bar{u} \rangle}{dz} + \frac{d}{dz}\left(q\lambda_4 \frac{d\langle \overline{u'\theta'} \rangle}{dz}\right) - \frac{q}{3\lambda_5}\langle \overline{u'\theta'} \rangle, \text{ and}$$

$$\frac{d\langle \overline{\theta'^2} \rangle}{dt} = 0 = -2\langle \overline{w'\theta'} \rangle \frac{d\langle \bar{\theta} \rangle}{dz} + \frac{d}{dz}\left(q\lambda_6 \frac{d\langle \overline{\theta'^2} \rangle}{dz}\right) - \frac{2q}{\lambda_7}\langle \overline{\theta'^2} \rangle, \quad (9)$$

where $S_\theta$ is the heat source, and $\lambda_4$ through $\lambda_7$ are additional length scales, where $a_4 = a_6 = 0.23$, $a_5 = 0.74$, and $a_7 = 10.10$.

The heat source term ($S_\theta$) is modeled as:

$$S_\theta = 2A(\overline{\theta_l} - \overline{\theta})/r_h \quad (10)$$

Here, A (in units $m^2 m^{-3}$) is the leaf area density, $(\overline{\theta_l} - \overline{\theta})$ is the mean leaf surface-to-ambient-air temperature difference, and $r_h$ is the aerodynamic resistance to heat transfer. A 1D radiative transfer and energy budget methodology is incorporated into the model calculation to make it possible to determine the heat source ($S_\theta$) for any time (i.e., any time of the day or night). First, the formulations to calculate the incoming total radiation at the canopy top as a function of cloud cover, latitude, longitude, day of year, and time of day are used as inputs; i.e., these inputs are used to determine the solar declination, hour, and zenith angles (Table 1). Thus, the total downward short-wave radiation at canopy top is:

$$R_{s\downarrow} = I_0 T_R T_G T_W T_A \cos\theta_z, \quad (11)$$

where $$I_0 = 1367\left(1 + 0.034 \cos\left[\frac{2\pi(n'-1)}{365}\right]\right)$$

is the extraterrestrial solar flux, n' is the day of year, $\theta_z$ is the solar zenith angle, and the short-wave transmission functions are as follows: for Rayleigh scattering ($T_R$), absorption by permanent gases ($T_G$), absorption by water vapor ($T_W$), and absorption and scattering by aerosols particles ($T_A$).

TABLE 1

Site Characteristics

| Variable | Range | Example |
| --- | --- | --- |
| Cloud amount (tenths) | 0 < CC < 1 | 0.2 |
| Cloud base (m) | 100 < CB < 5000 | 1000 |
| Latitude (+deg N) | 0 < LAT < 66 | 40 |
| Longitude (+deg W) | 0 < LON < 180 | 80 |
| Julian day | 1 < DOY < 365 | 191 |
| Local time (24 h) | 0.1 < LT < 24 | 14 |
| GMT minus LT (h) | 0 < DEL < 12 | 4 |

Then, the four spectral components for short-wave radiation (direct beam and diffuse visible+direct beam and diffuse near-infrared radiation, as a function of the total downward short-wave flux at canopy top) are calculated because extinction and reflection through the forest canopy are different for each. The remainder of the radiative transfer subroutine for the forest canopy (i.e., the transmission, reflection, absorption, and emission of the solar flux necessary to compute leaf surface-to-ambient-air temperature differences) is outlined.

The speed of sound through the atmosphere can be expressed as:

$$c_o = \sqrt{\frac{\gamma_s RT}{M}}, \quad (12)$$

where $R=8314.32 \text{ J mol}^{-1}\text{K}^{-1}$ is the universal gas constant, M is molecular mass, $$\gamma_s = \frac{c_p}{c_v}$$

is the ratio of specific heats. The ratio of specific heats and molar mass $$\left(\frac{\gamma_s}{M}\right)$$

as a function of temperature and humidity is:

$$\frac{\gamma_s}{M} = 0.04833 + (R_h - 0.023)A_T, \quad (13)$$

where $A_T=9.2\times10^{-5}+5.5\times10^{-6}\text{ T}+4.25\times10^{-7}T^2$, $R_h$ is the relative humidity (assumed constant with height above ground), and T is air temperature (° C.).

The transmission of sound waves in forests involves three main phenomena: (1) interference between direct and ground reflected acoustic waves; (2) scattering by tree trunks and branches, the ground, and turbulence; and (3) absorption by the trees, leaves, branches, the ground, and the air. Therefore, one might expect estimates of relative sound pressure level (in part) to depend on the strength and locations of wind speed and sound speed profile inversions between the ground and the model top (i.e., z=3h, where h is the height of the canopy).

Figure 2:
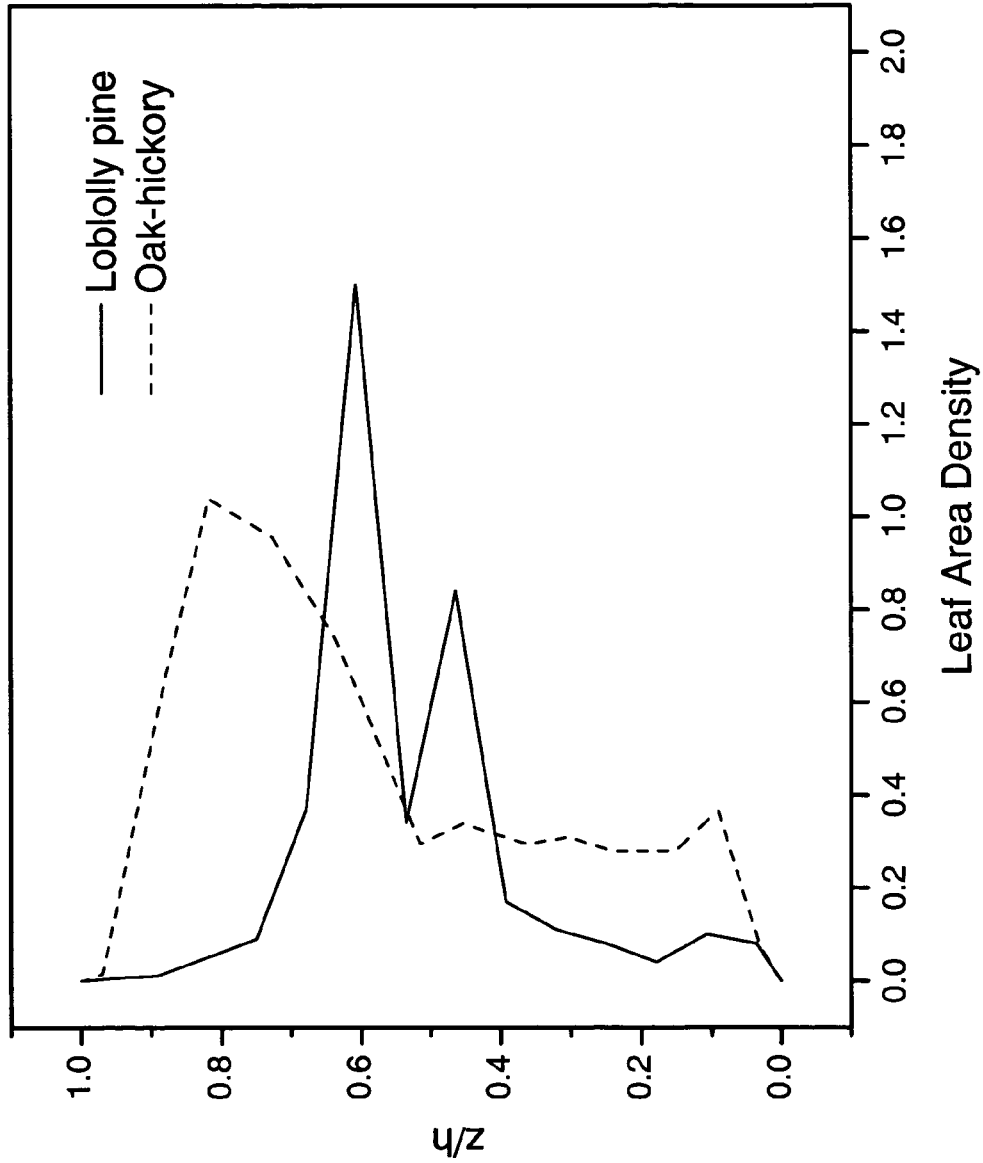
FIG. 2 is a graphical representation illustrating measured leaf area density profiles for the oak-hickory (dashed line) and loblolly pine (solid line) forest canopies according to an embodiment herein.
Figure 3:
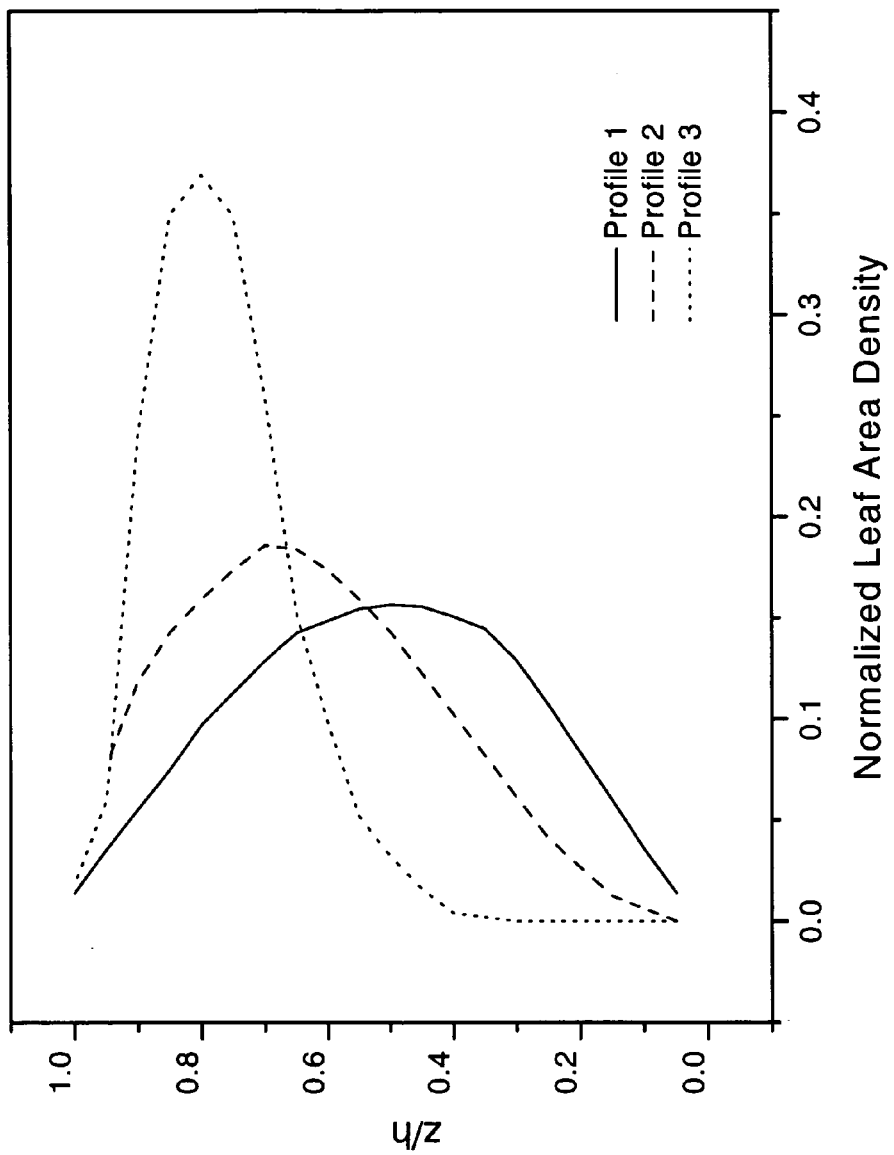
FIG. 3 is a graphical representation illustrating modeled vertical profiles of leaf area distribution for forest canopies according to an embodiment herein.
Figure 4:
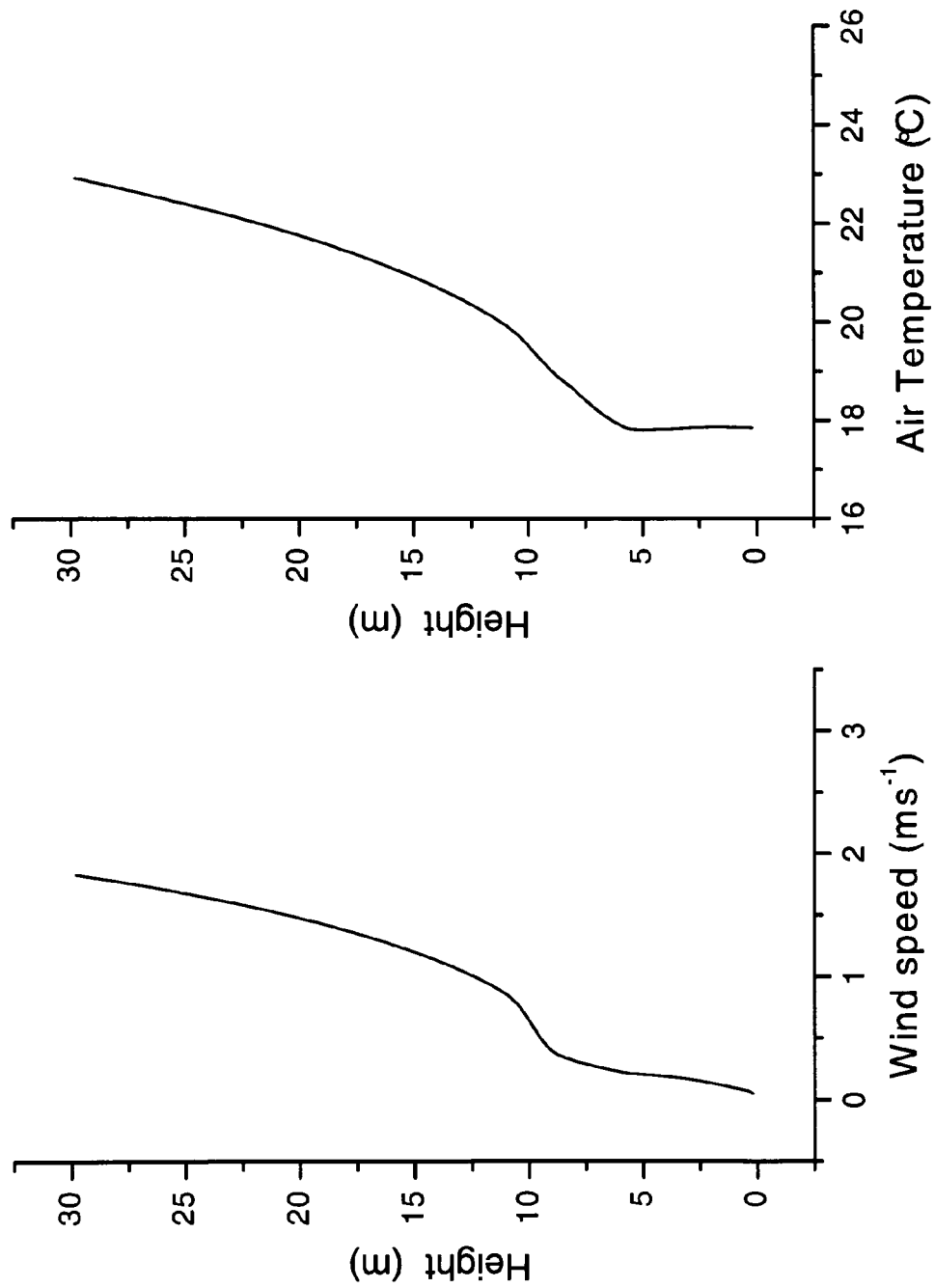
FIG. 4 is a graphical representation illustrating modeled profiles of the mean wind and air temperature inside and above a uniform forest canopy for nighttime stable, low wind speed conditions according to an embodiment herein.
Figure 5:
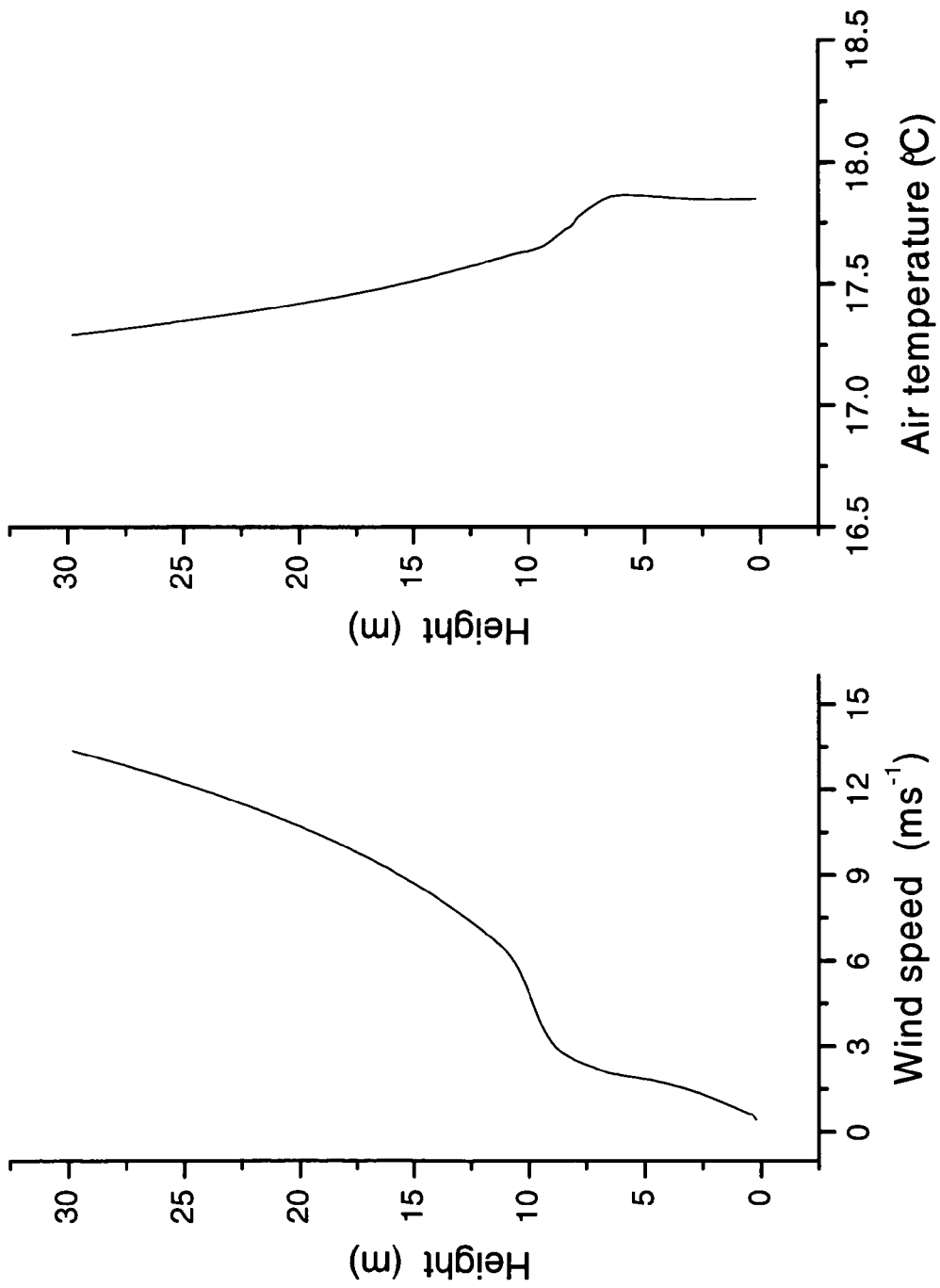
FIG. 5 is a graphical representation illustrating modeled profiles of the mean wind and air temperature inside and above a uniform forest canopy where strong winds prevail (near-neutral atmospheric conditions) according to an embodiment herein.
Figure 6:
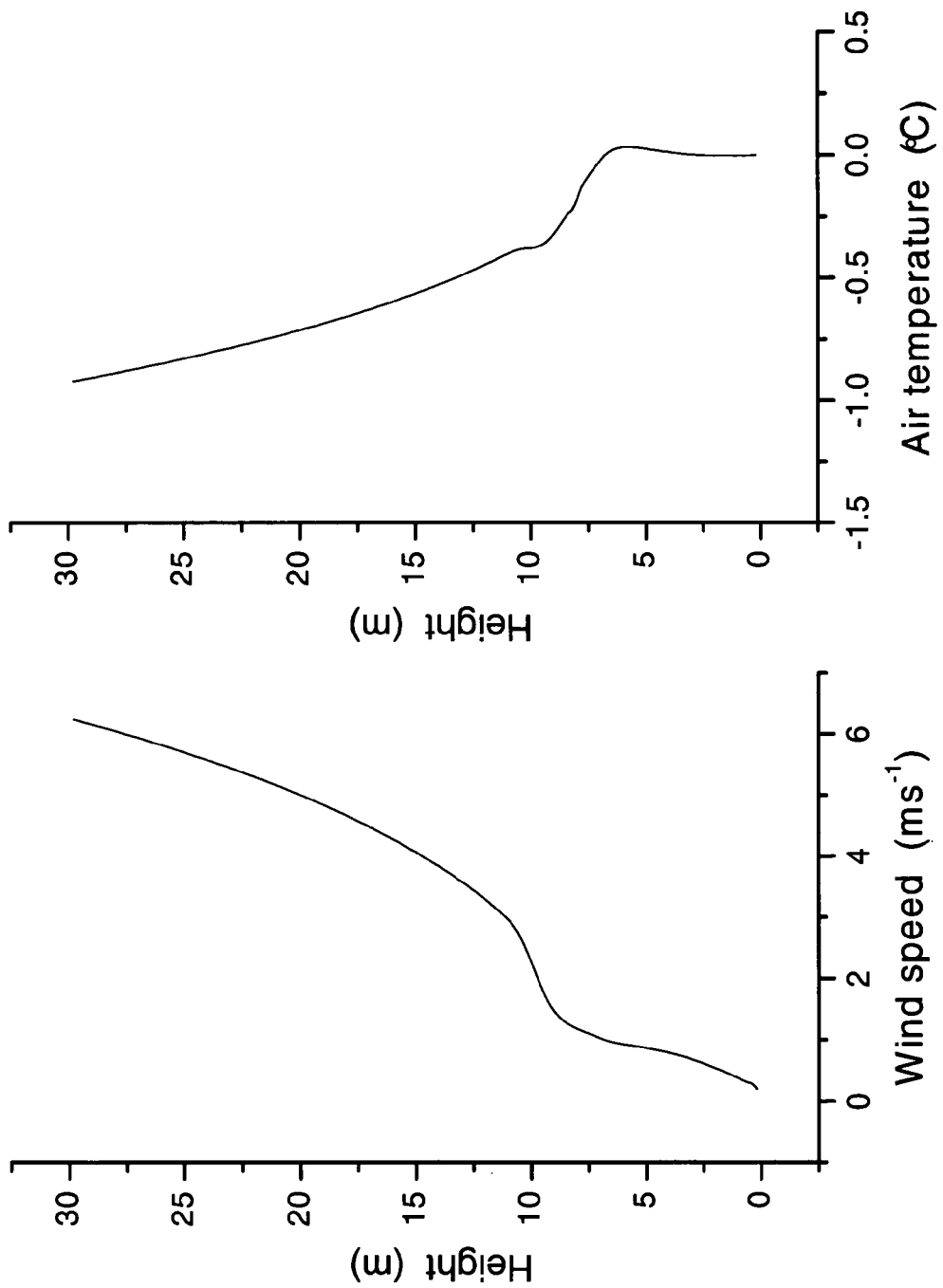
FIG. 6 is a graphical representation illustrating modeled profiles of the mean wind and air temperature inside and above a uniform forest canopy for daytime unstable conditions in cold regions according to an embodiment herein.

Forest canopy characterization plays an important role in defining the momentum and heat flux divergence through the forest layer. Different tree types can significantly affect the wind, temperature, and sound speed fields. As an example, leaf area density profiles for an oak-hickory and loblolly pine are shown in FIG. 2. Alternately, forest canopies may conform to one of three general leaf area distribution profiles as shown in FIG. 3. Moreover, leaf area distributions may not always be symmetric about the layer of maximum foliage density (such as profile-1) but may be more often skewed upward toward the top of the forest canopy. By definition, the leaf area index $$(LAI) \text{ is } LAI = \int_0^h A(z)\,dz,$$

where A(z) is the leaf area density through the small vertical layer between z and z+dz per unit surface area of ground below. Values for the leaf area index for forests vary but are generally most often in the range LAI=1 to 5.

Model input parameters related to canopy characteristics are presented in Table 2. The canopy height and the drag coefficient primarily influence the estimates of wind speed. The average leaf size (diameter) is incorporated in the energy budget calculation of leaf surface-to-ambient-air temperature differences. The total LAI and tree type, which determines the leaf area density profile, influence both the temperature and wind speed profile estimates. Both the 1D and 2D model calculations assume a relatively closed, continuous canopy.

TABLE 2

Canopy Characteristics

| Variable | Range | Example |
| --- | --- | --- |
| Canopy height (m) | 2 < h < 30 | 10 |
| Leaf area index | 1 < LAI < 6 | 4 |
| Avg. leaf size (m) | 0.01 < LD < 0.1 | 0.04 |
| Drag coefficient | 0.1 < Cd < 0.25 | 0.15 |
| Tree type | Pine, oak, etc . . . | |

Figure 8A:
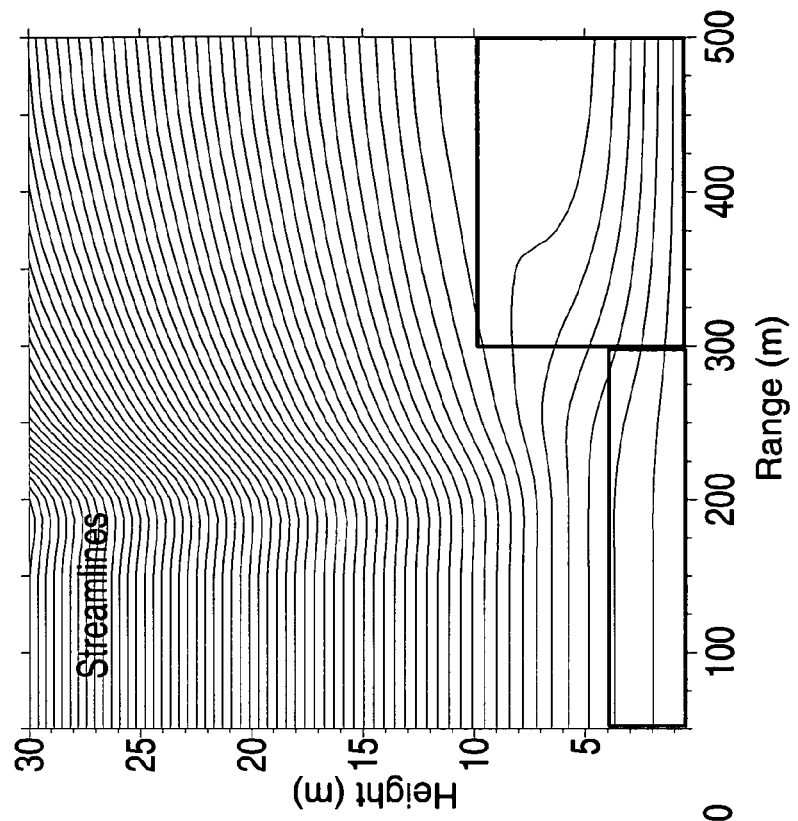
FIG. 8(A) is a graphical representation illustrating 2D model results of horizontal wind velocity, $\langle \bar{u} \rangle$, in units $ms^{-1}$, for non-uniform forest stands containing a single step change in canopy height according to an embodiment herein.
Figure 8B:
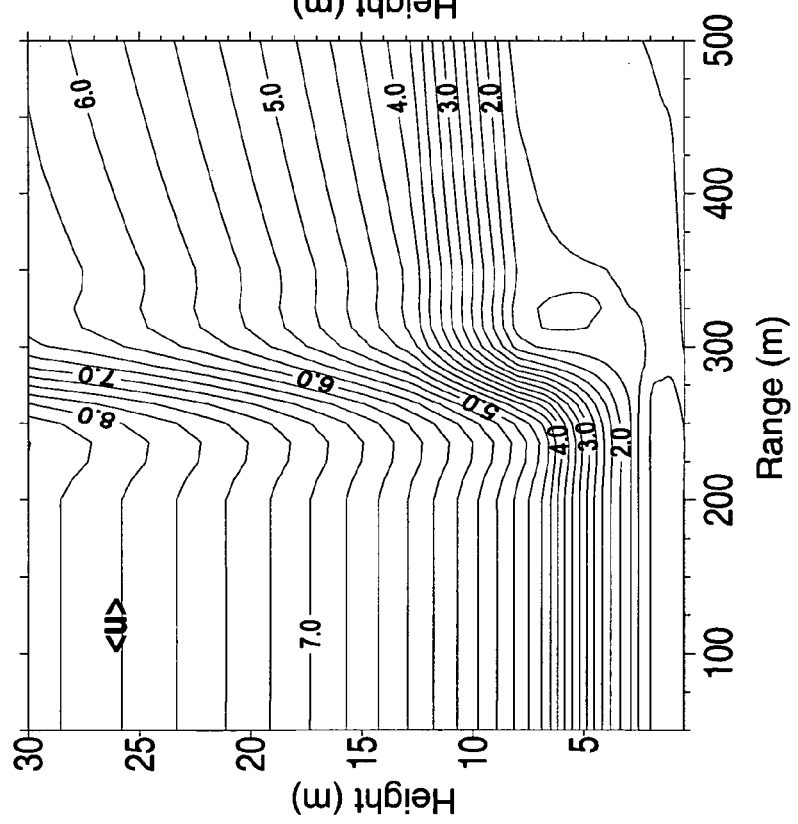
FIG. 8(B) is a graphical representation illustrating 2D model results of wind flow streamlines, for non-uniform forest stands containing a single step change in canopy height according to an embodiment herein.
Figure 10A:
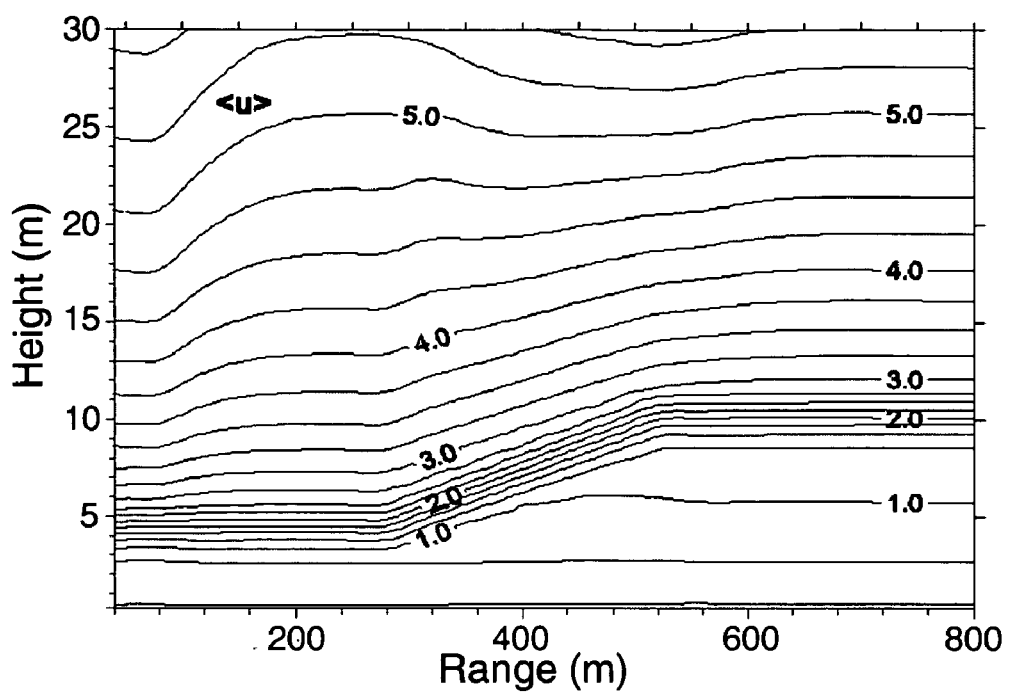
FIG. 10(A) is a graphical representation illustrating 2D model results of horizontal wind velocity, $\langle \bar{u} \rangle$, in units $ms^{-1}$, for non-uniform forest stands containing multiple step changes in canopy height according to an embodiment herein.
Figure 10B:
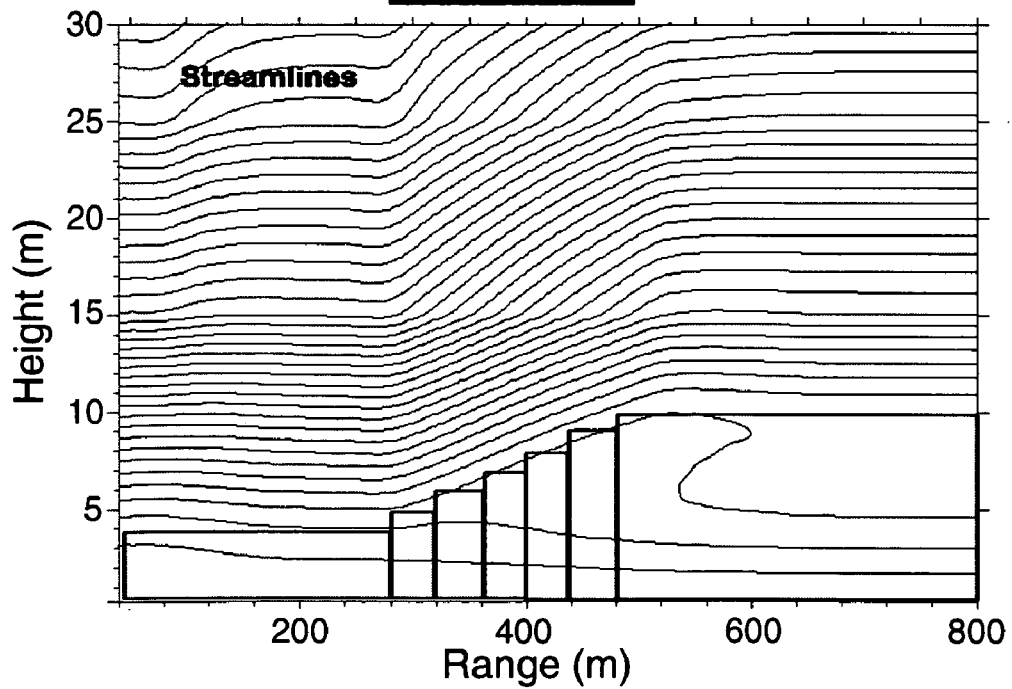
FIG. 10(B) is a graphical representation illustrating 2D model results of wind flow streamlines, for non-uniform forest stands containing multiple step changes in canopy height according to an embodiment herein.

Finally, the 1D model input parameters related to meteorological characteristics are presented in Table 3. This data shows that the 1D model is viable for many practical cases. Example 1D model output profiles are shown in FIGS. 4 through 7. Example 2D model output profiles are shown in FIGS. 8(A) through 10(B). In FIG. 8(A), the units for the profiles of the horizontal wind velocity is in units $\text{ms}^{-1}$; in FIG. 8(B), the profile illustrates dimensionless wind flow streamlines; in FIG. 9(A), the units for the profiles of the vertical wind velocity is in units $\text{ms}^{-1}$; and in FIG. 9(B), the units for the profiles of the fluctuation pressure is in units $\text{m}^{-2}\text{s}^{-2}$.

TABLE 3

Meteorological Characteristics

| Variable | Range | Typical |
| --- | --- | --- |
| Max. wind at 3 h (ms$^{-1}$) | 1 < U < 15 | 6 |
| Canopy top temp. (C.) | 0 < T < 40 | 20 |
| Relative humidity (%) | 1 < RH < 100 | 40 |
| Surface pressure (mbar) | 850 < PR < 1050 | 1000 |

The development of the 1D model makes it possible to generate realistic profiles for the winds and sound speed inside and above a forest canopy. As a result, it is established that acoustic transmission loss and ducting of acoustic waves in and around forests is significantly influenced by local meteorological profile structure. Hence, to begin to address non-uniform forests and forest edges, the earlier 1D models are further developed to create a model to calculate the 2D, steady state, canopy wind flow, temperatures, turbulent variances, Reynolds stress, and heat flux.

An acoustic ray path method is applied to the atmospheric surface layer for both uniform and non-uniform meteorology and turbulence conditions within and above uniform and non-uniform forests. Based on the principles and theory for geometrical acoustics for an inhomogeneous moving medium the ray path methodology predicts the general propagation paths of acoustic waves for a source as they are affected by refraction. Ray paths are computed as a function of range dependent wind and sound speed fields. The Appendix describes the manner in which the ray path method is applied.

Furthermore, the acoustic intensity may be due to geometrical divergence (i.e., energy loss due to spherical spreading) as an inverse function of range and the height difference between two adjacent rays. Also, acoustic intensity gain (or loss) due to frequency-dependent ground effects is included in the model calculation. Additionally, it is possible to improve the efficiency and realism of the 2D meteorological computer model by introducing a variable grid. A variable grid allows for better distribution of grid points and enables one to extend calculations higher into the boundary layer above the forest. A finer grid inside the forest and a coarser grid above the forest help to resolve important meteorological (and acoustic) scales and processes. The Appendix describes the manner in which the variable grid technique is applied.

The energy budget for the forest canopy can be calculated as follows.

$$R_{abs} - R_{L\uparrow} - H - L'E = 0 \quad (14)$$

where $R_{abs}$ is the absorbed radiative flux, $R_{L\uparrow}$ is the upward long-wave (emitted) flux ($=\epsilon_s \sigma T_L^4$), $\epsilon_s$ is the canopy surface emissivity (=0.98), $\sigma$ is the Stefan-Boltzmann constant ($=5.67 \times 10^{-8}$ Wm$^{-2}$K$^{-4}$), $T_L$ is the leaf (or tree) surface temperature, H is the sensible heat flux, and L'E is the latent heat (moisture) flux.

The absorbed radiative flux, $R_{abs}$; i.e., that which will determine the heating of the leaves, branches, and the ambient air through the canopy, can be written as:

$$R_{abs} = [(1-\tau_{bv})\tau_{bv}S_{bv} + (1-\tau_{dv})\tau_{dv}S_{dv}](1-\rho_{vis}) + [(1-\tau_{bn})\tau_{bn}S_{bn} + (1-\tau_{dn})\tau_{dn}S_{dn}](1-\rho_{nir}) + \alpha_L R_{L\downarrow} \quad (15)$$

where $S_{bv}$ is a constant; i.e., the total direct beam visible flux at the canopy top. Similarly, $S_{bn}$ is the total direct beam near-infrared flux, $S_{dv}$ is the total diffuse visible flux, and $S_{dn}$ is the total diffuse near-infrared flux (at the canopy top). In Equation (15), $\tau_{ij}S_{ij}$ is the remaining (available) radiative flux at a given level of the canopy. It follows that the coefficient $(1-\tau_{ij})$ defines the fraction of available radiation intercepted by the leaves (at each level). Also in Equation (15), $\alpha_L$ is the long-wave absorptivity (=1.0) and $R_{L\downarrow}$ is the downward long-wave flux as a function of ambient air temperature, $T_a$. The transmission functions for direct beam visible, $\tau_{bv}$, and direct beam near-infrared, $\tau_{bn}$, as a function of distance from the canopy top, can be determined from the following expression:

$$\tau_b = \exp(\sqrt{\alpha_{std}} K_b \Omega L), \quad (16)$$

where the mean leaf absorptivity ($\alpha_{std}$) for visible light is approximately 0.8 and for near infrared is approximately 0.2. Also in Equation (16), the extinction coefficient is $K_b=(2\cos\theta_z)^{-1}$. The leaf-clumping factor, $\Omega$, describes heterogeneous (non-uniform) distributions of leaves on tree branches. Typical values for the leaf-clumping factor are $\Omega=0.95$ (Sugar Maple), $\Omega=0.9$ (Oak), $\Omega=0.7$ (Aspen), $\Omega=0.5$ (Jack Pine) and $\Omega=0.4$ (Black Spruce). When canopy leaves are randomly (uniformly) distributed $\Omega=1.0$. Finally, L is the downward cumulative leaf area index; i.e., $$L = \int_z^h A(z)\,dz.$$

In contrast, the transmission functions for diffuse visible light, $\tau_{dv}$, and diffuse near infrared, $\tau_{dn}$, can be written as:

$$\tau_d = 2\int_0^{\pi/2} \tau_b \sin\theta_z \cos\theta_z \, d\theta_z, \quad (17)$$

where $\tau_z$ is the solar zenith angle. In addition, reflectivity (and scattering) of light for visible (vis) and near infrared (nir) through the entire canopy is defined as follows:

$$\rho_{vis}, \rho_{nir} = \left(\frac{1-\sqrt{\alpha_{std}}}{1+\sqrt{\alpha_{std}}}\right)\left(\frac{2K_b}{K_b+1}\right). \quad (18)$$

The last term in Equation (15) is the downward long-wave flux, which can be written as:

$$R_{L\downarrow} = -170.9 + 1.195\sigma T_a^4 + 0.3 f_c \epsilon_c T_c^4, \quad (19)$$

where the expression on the far right hand side accounts for additional long-wave radiation from clouds. In that case, $f_c$ is fractional cloud amount, $\epsilon_c$ is cloud emmisivity (approximately 0.9-1.0 for low to midlevel clouds), and $T_c$ is the air temperature (K) at the cloud base. Thus, the absorbed radiative flux, $R_{abs}$, given by Equation (15) is now complete.

However, there remain several energy budget terms in Equation (14) to be defined. The sensible heat flux, for example, can be written as:

$$H = \frac{\rho c_p}{r_h}(T_L - T_a), \quad (20)$$

where $\rho$ is air density, $c_p$ is the specific heat of air at constant pressure ($=1005.8$ J kg$^{-1}$ K$^{-1}$), and the aerodynamic resistance to heat transfer (in units s m$^{-1}$) is $$r_h = \frac{\rho c_p}{9.14}\left(\frac{d}{u}\right)^{0.5},$$

where d is a characteristic leaf diameter (=0.10 m) and u is the mean canopy layer wind velocity.

Next, the latent heat (moisture) flux can be written as:

$$L'E = 2L'\frac{\rho(q_L - q_a)}{r_a + r_s}, \quad (21)$$

where L' is the latent heat of vaporization $$\left(= 2.450 \times 10^6 \frac{J}{kg}\right),$$

$q_L$ is the specific humidity at the leaf surface, and $q_a$ is the specific humidity of the ambient air. Here, the quantities $q_L$ and $q_a$ are determined as a function of mean relative humidity for the canopy layer, $R_h$, ambient air temperature, $T_a$, and leaf (or tree) surface temperature, $T_L$. Also in Equation (21), the aerodynamic resistance to water vapor transfer is calculated as $$r_a = 200\left(\frac{d}{u}\right)^{0.5},$$

and the stomatal resistance to water vapor transfer is calculated as $$r_s = r_{s_{min}}\left(1 + \frac{c}{I}\right),$$

where I is visible light intensity, c is a light response parameter (i.e., for many tree types, c has a value of about 40), and in forests, $r_{s_{min}}$ has a value ranging from approximately 100 to 300 sm$^{-1}$.

Again from Equation (14), $R_{L\downarrow}$, H, and L'E all require a value for the surface temperature, $T_L$, which can be determined using a Penman-type expression as:

$$T_L = T_a + \frac{\gamma*}{s + \gamma*}\left(\frac{r_e(R_{abs} - \varepsilon_s \sigma T_a^4)}{\rho c_p} - \frac{(\rho_{vs} - \rho_{va})}{\gamma*}\right), \quad (22)$$

where $$\gamma* = \gamma\frac{r_a + r_s}{2r_e}, \quad \frac{1}{r_e} = \frac{1}{r_h} + \frac{1}{r_r}, \quad r_r = \frac{\rho c_p}{4\varepsilon_s \sigma T_a^3}, \quad \text{and} \quad \gamma = 0.66\frac{mb}{C}.$$

In Equation (22), $\rho_{vs}$ and $\rho_{va}$ are saturation vapor density and vapor density of the ambient air, respectively. Finally, Equation (22) allows one to obtain the appropriate heat source profile through the canopy (needed to predict the mean temperature) as:

$$S_\theta = \frac{2A(z)(T_L - T_a)}{r_h}, \quad (23)$$

where the integral sum of the heat source profile redefines the kinematic heat flux at the top of the canopy.

Numerical Experiments

The Blossom Point Field Test Facility is an approximately 1,600 acre U.S. Army Research Laboratory installation located near La Plata, Md. along the Potomac River. Blossom Point is a protected and relatively interference-free environment within which to conduct electro-optic and acoustic field work. At the time of the experiment, the forest subplot of the Blossom Point Field Test Facility is primarily aligned west to east in a rectangle bordered by an open field to the west and south and access roads to the east and north. As viewed from a 30 m meteorological tower at the northwest corner of the subplot, the forest crowns (overstory) are predominantly deciduous with a few intermittent pines. The understory is almost exclusively American. Holly. The deciduous species is predominantly Sweetgum and Red Maple. Canopy heights for the deciduous trees are h=22.4 m (on average) and the stem count is approximately 1000 ha$^{-1}$ [where 1 hectare (ha)= 10,000 m$^2$]. Canopy heights for the understory are h=4.1 m (on average) with the tallest crown tops at h=9.1 m. Finally, the forest subplot at Blossom Point is a relatively closed and continuous canopy.

The following results are from numerical experiments that were conducted to simulate the microclimate environment within and above the forest subplot at Blossom Point for typical clear sky, midday (i.e., 1400 LT) atmospheric conditions. Table 4 provides a summary of the experiments, which are described in terms of the following model parameters: leaf area profile, total leaf area index (LAI), upper level (i.e., model top) wind speed ($u_{max}$), friction velocity ($u_*$), in units ms$^{-1}$, temperature scaling ($\theta_*$), in units K, and kinematic heat flux ($Q=-u_*\theta_*$), in units mKs$^{-1}$. In micrometeorology, friction velocity squared is a measure of the horizontal shearing stress and temperature scaling is related to the temperature lapse rate. (For this study, relative humidity is RH=30% and remains constant within and above the canopy.)

TABLE 4

Summary of Numerical Experiments

|  | LAI | $u_{max}$ (ms$^{-1}$) | $u_*$ (ms$^{-1}$) | $\theta_*$ (K) | $Q = -u_*\theta_*$ |
|---|---|---|---|---|---|
| Experiment #1 |  |  |  |  |  |
| profile-1 | 4 | 6.0 | 1.04 | -0.50 | 0.52 |
| profile-2 | 4 | 6.0 | 0.96 | -0.53 | 0.51 |
| profile-3 | 4 | 6.0 | 0.85 | -0.61 | 0.51 |
| Experiment #2 |  |  |  |  |  |
| profile-2 | 4 | 1.0 | 0.16 | -2.53 | 0.40 |
| profile-2 | 4 | 3.0 | 0.48 | -0.99 | 0.47 |
| profile-2 | 4 | 6.0 | 0.96 | -0.53 | 0.51 |
| profile-2 | 4 | 9.0 | 1.44 | -0.37 | 0.53 |
| Experiment #3 |  |  |  |  |  |
| profile-2 | 2 | 6.0 | 1.05 | -0.20 | 0.21 |
| profile-2 | 3 | 6.0 | 1.03 | -0.37 | 0.38 |
| profile-2 | 4 | 6.0 | 0.96 | -0.53 | 0.51 |
| profile-2 | 5 | 6.0 | 0.91 | -0.67 | 0.61 |

In Experiment #1, the three different cases correspond to the three different leaf area density distribution profiles shown in FIG. 3. It is seen that $u_*$ and $\theta_*$ vary slightly as a function of the leaf area profile, while Q remains fairly constant. In contrast, Experiment #2 keeps the same leaf area distribution profile but tests the sensitivity of the 1D model output for different wind speed conditions. Here, it is seen that the wind and temperature scaling (i.e., their profile gradients) are greatly influenced by the magnitude of the wind at the model top. Finally, Experiment #3 keeps the same leaf area profile and wind speeds but tests the sensitivity of the 1D model output to changes in total LAI. In Experiment #3, $u_*$ remains fairly constant, while $\theta_*$ and Q vary by approximately a factor of three. Hence, total LAI also appears to be an important factor (i.e., model parameter) influencing the canopy microclimate.

Figure 11:
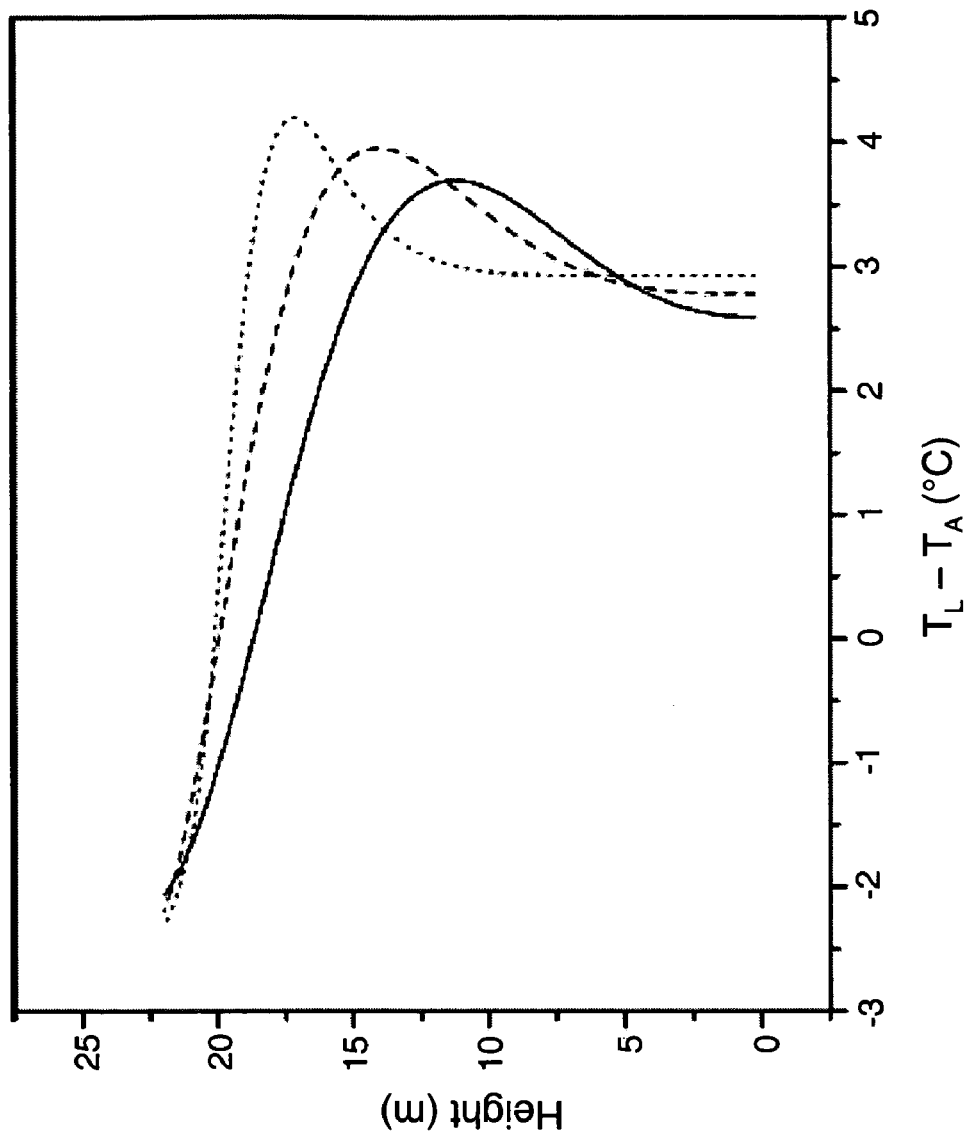
FIG. 11 is a graphical representation illustrating modeled profiles for leaf surface-to-ambient air temperature differences for the three cases in Experiment #1 according to an embodiment herein.

FIG. 11 shows the modeled profiles for leaf surface-to-ambient air temperature differences for the three cases in Experiment #1. In FIG. 11, the three curves correspond to three different leaf area distributions; i.e., profile-1 (solid line); profile-2 (dashed line); and profile-3 (dotted line). In this example, leaf surface temperatures larger than ambient do not occur in the uppermost part of the canopy; i.e., $T_L-T_a \leq 0$ for $z \geq 18.5-20.0$ m, depending on the leaf area profile. Maximum values for $T_L-T_a$ in the tree crowns are shown to be approximately 3.7 to 4.2° C., also depending on the leaf area profile. In the trunk spaces, below the layer of leaves and branches, approximately a 2.8° C. temperature difference is computed for all three cases. These estimates reflect the balance between the incoming solar energy absorbed by the canopy and the outgoing long-wave energy emitted from the surrounding air. The absorbed radiative flux depends, in part, on the amount of short wave (visible and near-infrared) energy transmitted downward through the forest from the canopy top. The other part is the downward long-wave flux as a function of ambient air temperature and cloud cover. Increasing the canopy leaf area index from LAI=4 to LAI=5 or LAI=6 reduces some of the temperature differences in the trunk space. This takes place because the amount of absorbed radiation is reduced through the lower canopy.

FIGS. 12(A) and 12(B) respectively illustrate the continuous profiles of mean wind speed and air temperature inside and above the forest canopy for the three cases previously outlined. In FIGS. 12(A) and 12(B), the three curves correspond to three different leaf area distributions; i.e., profile-1 (solid line); profile-2 (dashed line); and profile-3 (dotted line). In general, wind speed profiles at some height above tall roughness elements will be similar in form to those described for lower roughness elements, for steady state and horizontally homogeneous conditions. As a result, the modeled wind speed profiles above the canopy appear quite similar to wind speed profiles in open fields; i.e., logarithmically increasing with height above the roughness plane. It is shown, however, that the model results are sensitive to variations in the assumed leaf area distribution in the canopy below. Inside the forest, the winds are shown to decrease rapidly as momentum becomes depleted through the layers of leaves and branches. In addition, for the case that corresponds to profile-3, the model produces a secondary wind speed maximum at a height of about z=12.0 m.

FIGS. 12(A) and 12(B) also show that the model produces a local maximum in air temperature within the canopy around the height of maximum leaf density (mainly for profile-3 but also slightly for profile-2). This coincides nicely with the height of the local minimum in wind speed. Generating such temperature inversions appears to be quite sensitive to variations in the leaf area distribution profile. Finally, temperature lapse rates above the canopy are also sensitive to variations in the assumed leaf area distribution profile.

Figure 13:
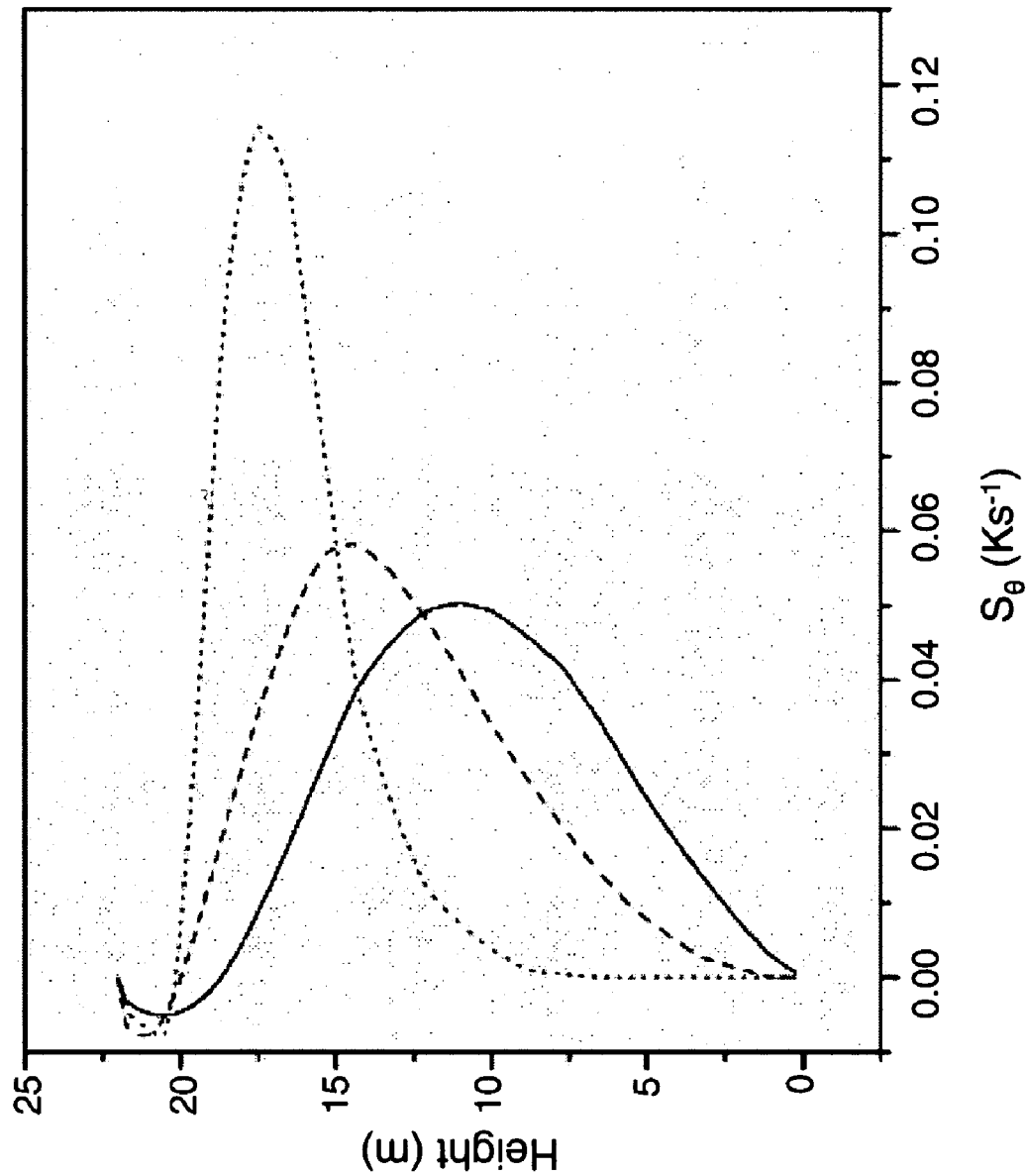
FIG. 13 is a graphical representation illustrating modeled profiles for the heat source ($S_\theta$) for the cases outlined in Experiment #1 according to an embodiment herein.

FIG. 13 shows the modeled profiles for the heat source $(S_\theta)$, in units $Ks^{-1}$, for the cases outlined in Experiment #1. Here, the modeled profiles, as described by Equation (23), closely resemble the leaf area distribution profiles shown in FIG. 3. While they appear quite different in shape, the three profiles integrate to approximately the same value; i.e., $Q=0.51$ mKs$^{-1}$.

Figure 14:
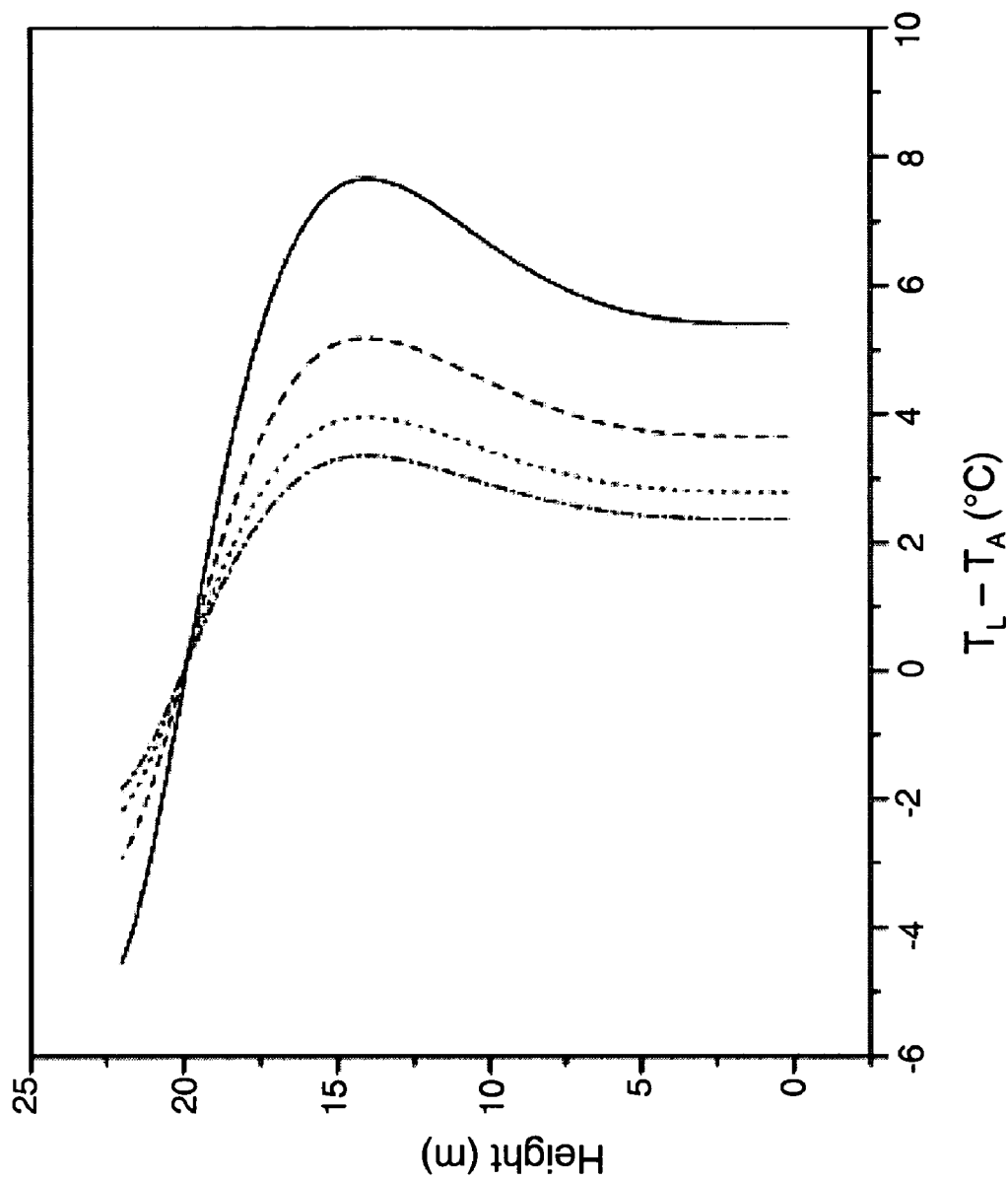
FIG. 14 is a graphical representation illustrating modeled profiles for leaf surface-to-ambient air temperature differences for the four cases described in Experiment #2 according to an embodiment herein.

FIG. 14 shows the modeled profiles for leaf surface-to-ambient air temperature differences for the four cases described in Experiment #2. The four curves in FIG. 14 correspond to four different wind speed conditions at the model top; i.e., $u_{max}=1.0$ ms$^{-1}$ (solid line); $u_{max}=3.0$ ms$^{-1}$ (dashed line); $u_{max}=6.0$ ms$^{-1}$ (dotted line); and $u_{max}=9.0$ ms$^{-1}$ (dashed-dotted line). Here, the maximum values for $T_L-T_a$ in the tree crowns range from 3.3° C. for $u_{max}=9.0$ ms$^{-1}$ to 7.7° C. for $u_{max}=1.0$ ms$^{-1}$. Similarly, in the trunk spaces, much lower temperature differences (approximately 2.4° C.) result in higher wind speed conditions than in lower wind speed conditions (approximately 5.5° C.). This is in stark contrast to FIG. 11, wherein computed temperature differences in the trunk spaces remain fairly constant for all three cases.

Figure 15B:
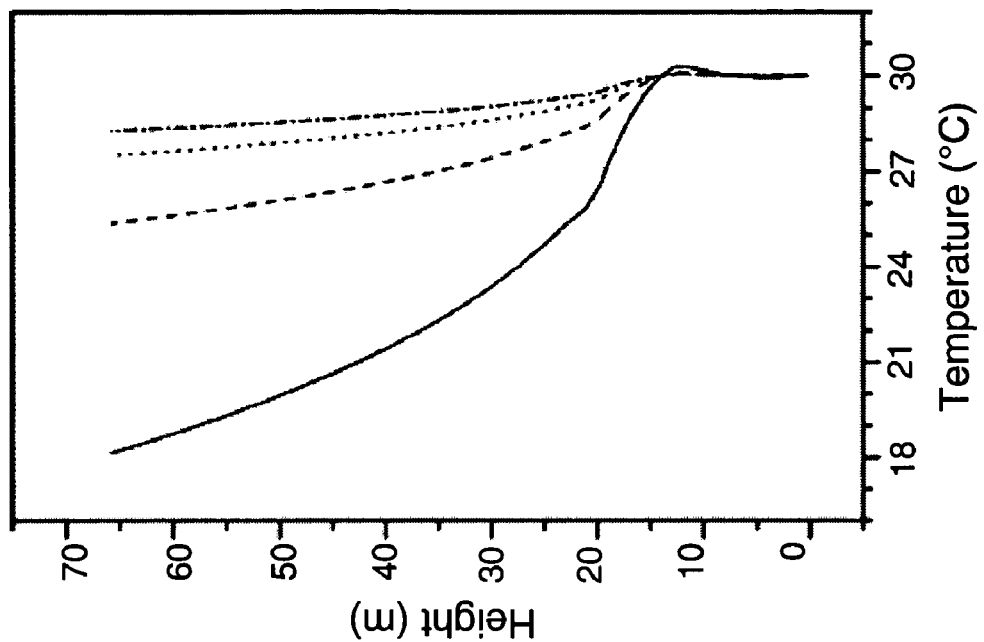
FIG. 15(B) is a graphical representation illustrating modeled profiles of mean air temperature inside and above the forest canopy for the three cases in Experiment #2 according to an embodiment herein.
Figure 15A:
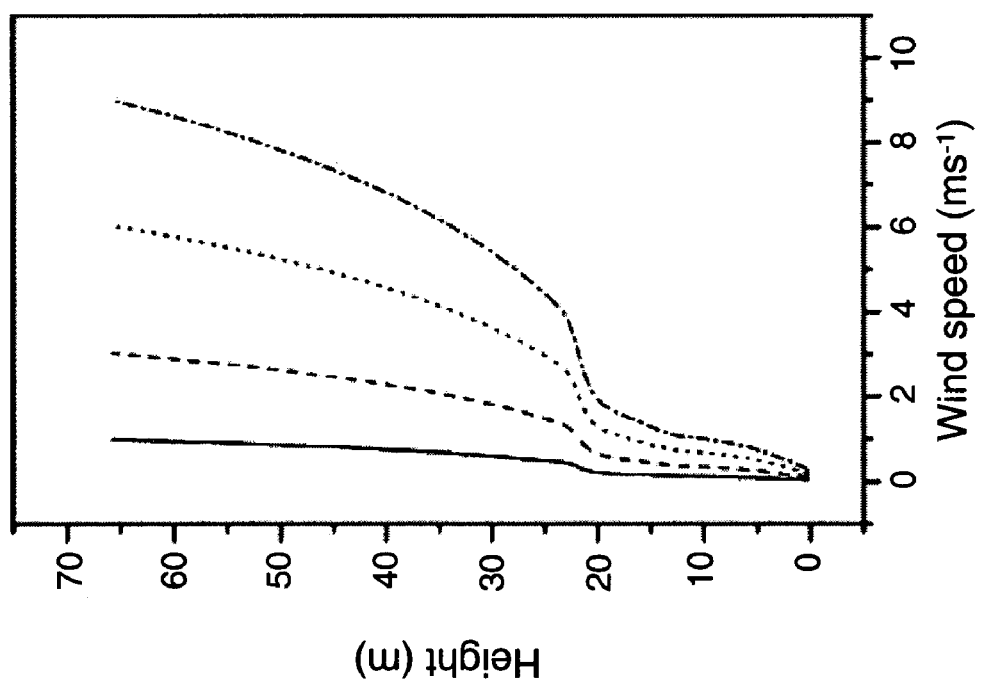
FIG. 15(A) is a graphical representation illustrating modeled profiles of mean wind speed inside and above the forest canopy for the three cases in Experiment #2 according to an embodiment herein.

FIGS. 15(A) and 15(B) show the continuous profiles of mean wind speed and air temperature inside and above the forest canopy for the cases described in Experiment #2. The four curves in each of FIGS. 15(A) and 15(B) are defined the same as in FIG. 14. Here, it is shown that the wind and temperature profile gradients are greatly influenced by the magnitude of the wind at the model top (as mentioned above). In particular, rather steep computed temperature gradients result when $u_{max}=1.0$ ms$^{-1}$.

Figure 16:
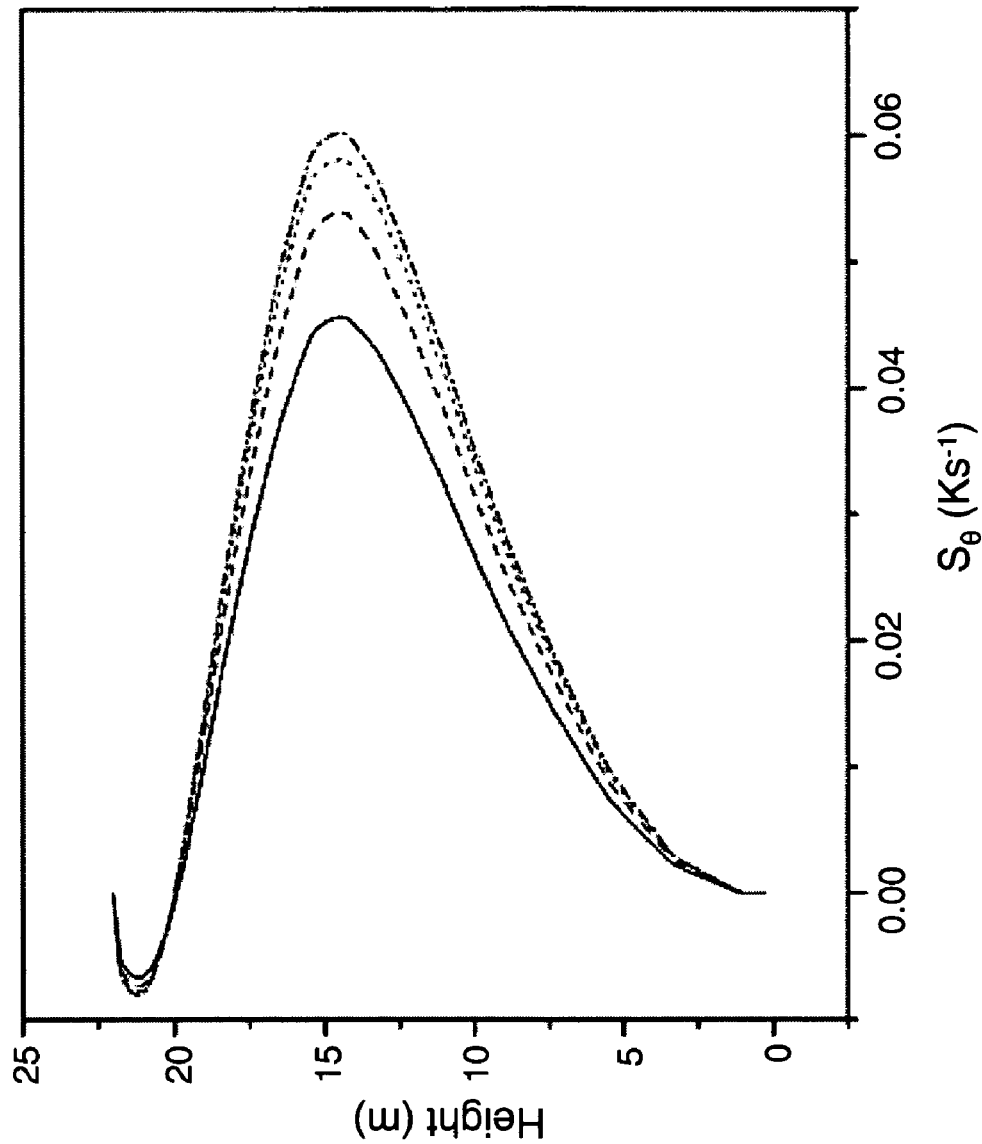
FIG. 16 is a graphical representation illustrating modeled profiles for the heat source ($S_\theta$) for the cases outlined in Experiment #2 according to an embodiment herein.

FIG. 16 shows the modeled profiles for the heat source $(S_\theta)$ for the cases outlined in Experiment #2. The four curves in FIG. 16 are defined the same as in FIG. 14. Here, it is shown that the computed profiles for $S_\theta$ are also effected by the magnitude of the wind at the model top. In particular, it is shown that the largest differences in the computed heat source occur in the transition from $u_{max}=1.0$ ms$^{-1}$ to 3.0 ms$^{-1}$; i.e., at the lower wind speeds. Also, the total integrated heat source $$\left(\text{i.e., } Q = \int_0^h S_\theta dz\right)$$

at the higher wind speeds is larger. This is primarily due to the higher computed stress $(u_*^2)$ caused by stronger winds through the tree canopy.

Figure 17:
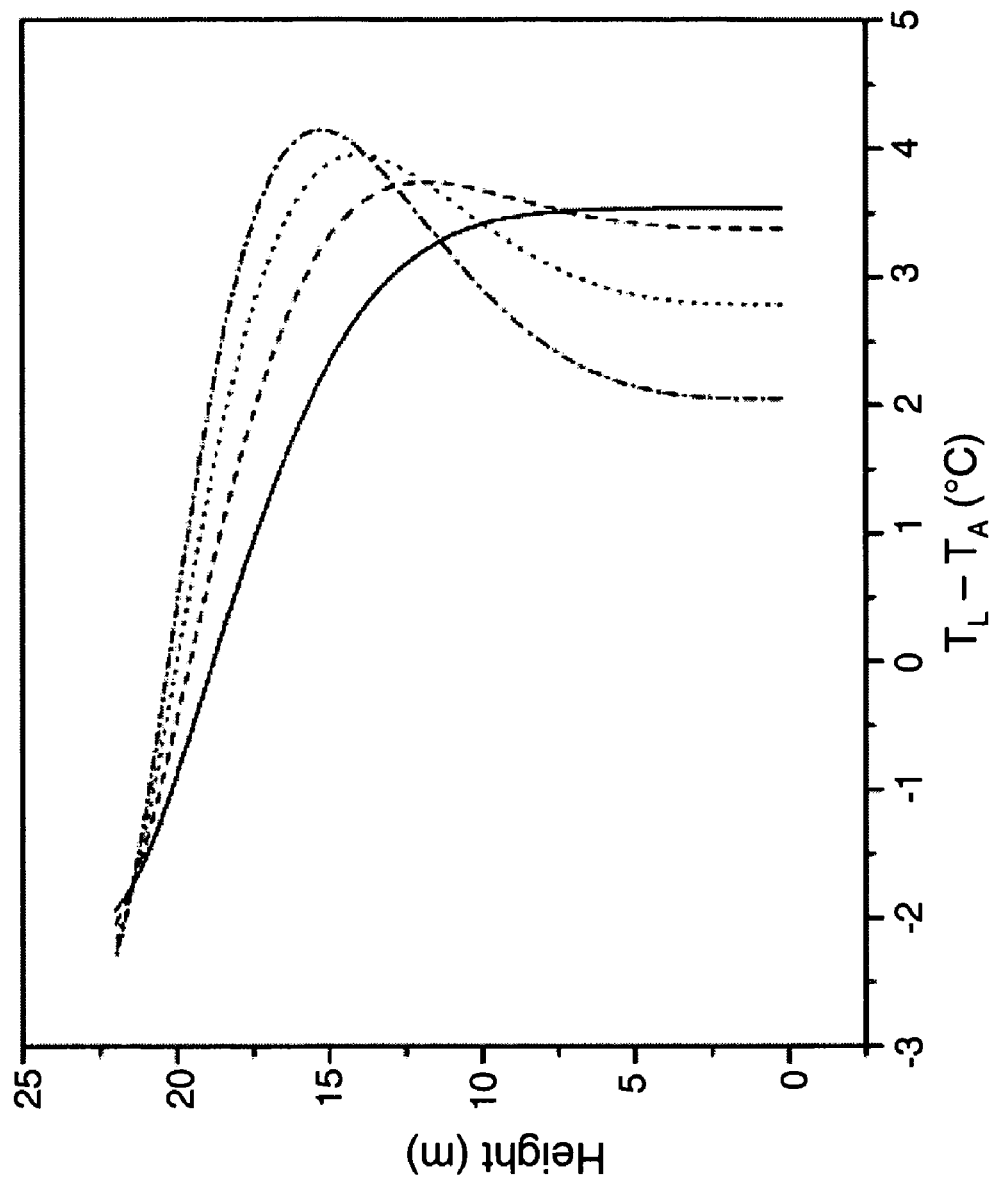
FIG. 17 is a graphical representation illustrating modeled profiles for leaf surface-to-ambient air temperature differences for the four cases described in Experiment #3 according to an embodiment herein.

FIG. 17 shows the modeled profiles for leaf surface-to-ambient air temperature differences for the four cases described in Experiment #3. The four curves in FIG. 17 correspond to four different assignments of total leaf area index; i.e., LAI=2 (solid line); LAI=3 (dashed line); LAI=4 (dotted line); and LAI=5 (dashed-dotted line). Here, the maximum computed values for $T_L-T_a$ in the tree crowns are largest for the largest LAI. In addition, the smallest computer temperature differences in the trunk spaces occur for the largest LAI. Increasing the canopy leaf area index from LAI=2 to LAI=5 is clearly shown to reduce the temperature differences in the trunk spaces. This takes place because the amount of absorbed radiation through the lower canopy is highly dependent on the canopy leaf (area) density, as mentioned above.

FIGS. 18(A) and 18(B) show the modeled profiles of mean wind speed and air temperature for the cases described in Experiment #3. The four curves in each of FIGS. 18(A) and 18(B) are defined the same as in FIG. 17. Here, of particular interest is the differences in the wind speed profiles inside the canopy. In particular, it is shown that the average wind speed $(\bar{u})$ below the canopy top is largest for smaller total LAI (and vice versa). This is due to changes in canopy drag forces, depending on LAI.

Figure 19:
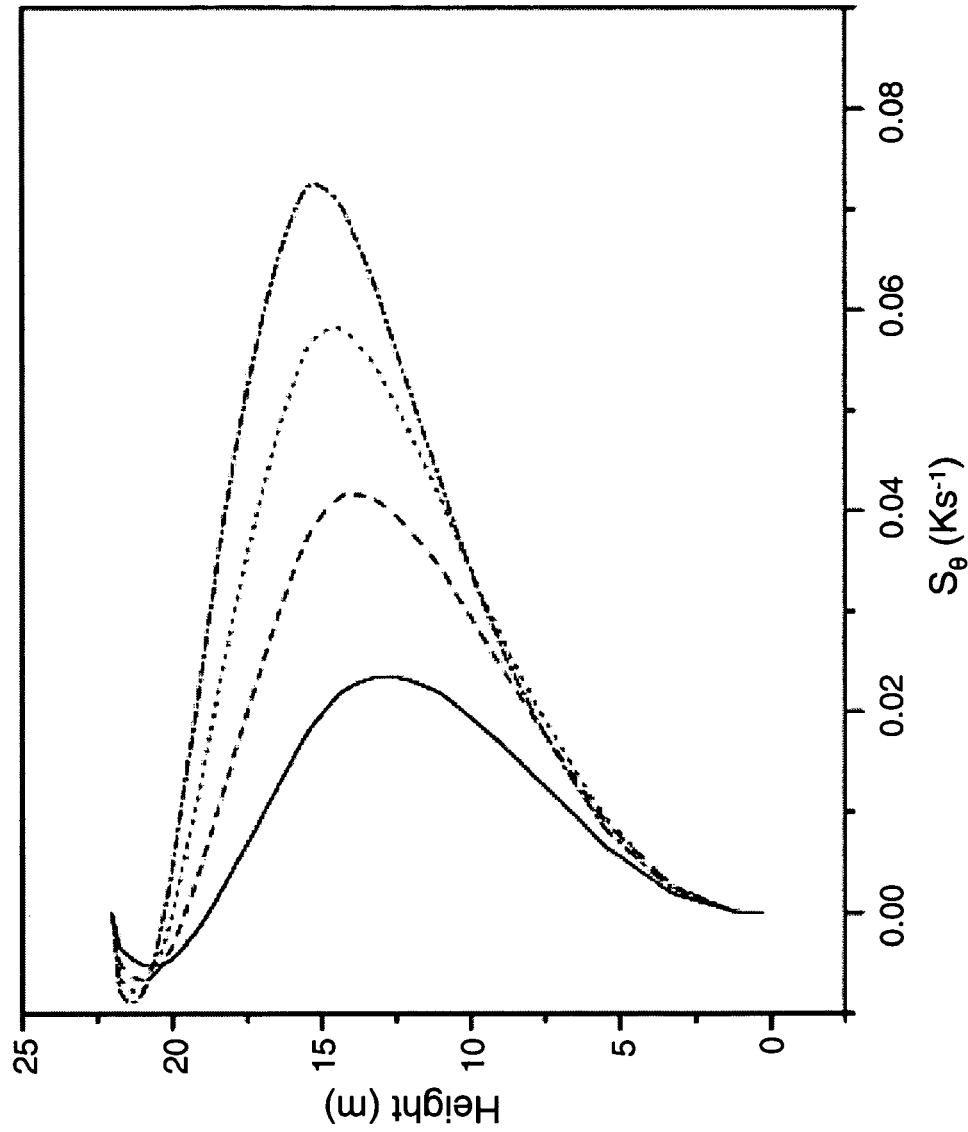
FIG. 19 is a graphical representation illustrating modeled profiles for the heat source ($S_\theta$) for the cases outlined in Experiment #3 according to an embodiment herein.

Finally, FIG. 19 shows the modeled profiles for the heat source ($S_\theta$) for the cases outlined in Experiment #3. The four curves in FIG. 19 are defined the same as in FIG. 17. Here, it is shown that the computed profiles for $S_\theta$ are greatly affected by the total LAI. Maximum values for $S_\theta$ are shown to vary by a factor of four from LAI=2 to LAI=5. Clearly, the sensitivity of the model output to LAI (Experiment #3) is much greater than that to the magnitude of the wind at the model top (Experiment #2) or to the assumed leaf area distribution profile itself (Experiment #1).

Thus, the experiments demonstrate that the microclimate (i.e., energy budget) of a forest stand at Blossom Point could be explored mathematically via a 1D computer model for forest meteorology. As described above, three numerical experiments were conducted. It was found that wind speed and temperature profile gradients are greatly influenced by the assumed leaf area distribution profile as well as the magnitude of the wind at the model top. However, total LAI appears to be the most important factor (i.e., model parameter) influencing the canopy microclimate.

An unexpected result of the experiments was the rather steep computed temperature gradients that occurred in very low wind speed conditions. At midday, the model provided by the embodiments herein can potentially generate approximately 4-8° C. leaf-to-air temperature differences, yet the stable (inversion) layer through the upper canopy of the forest remains shallow and relatively weak (<<1° C.) or nonexistent.

Figure 20:
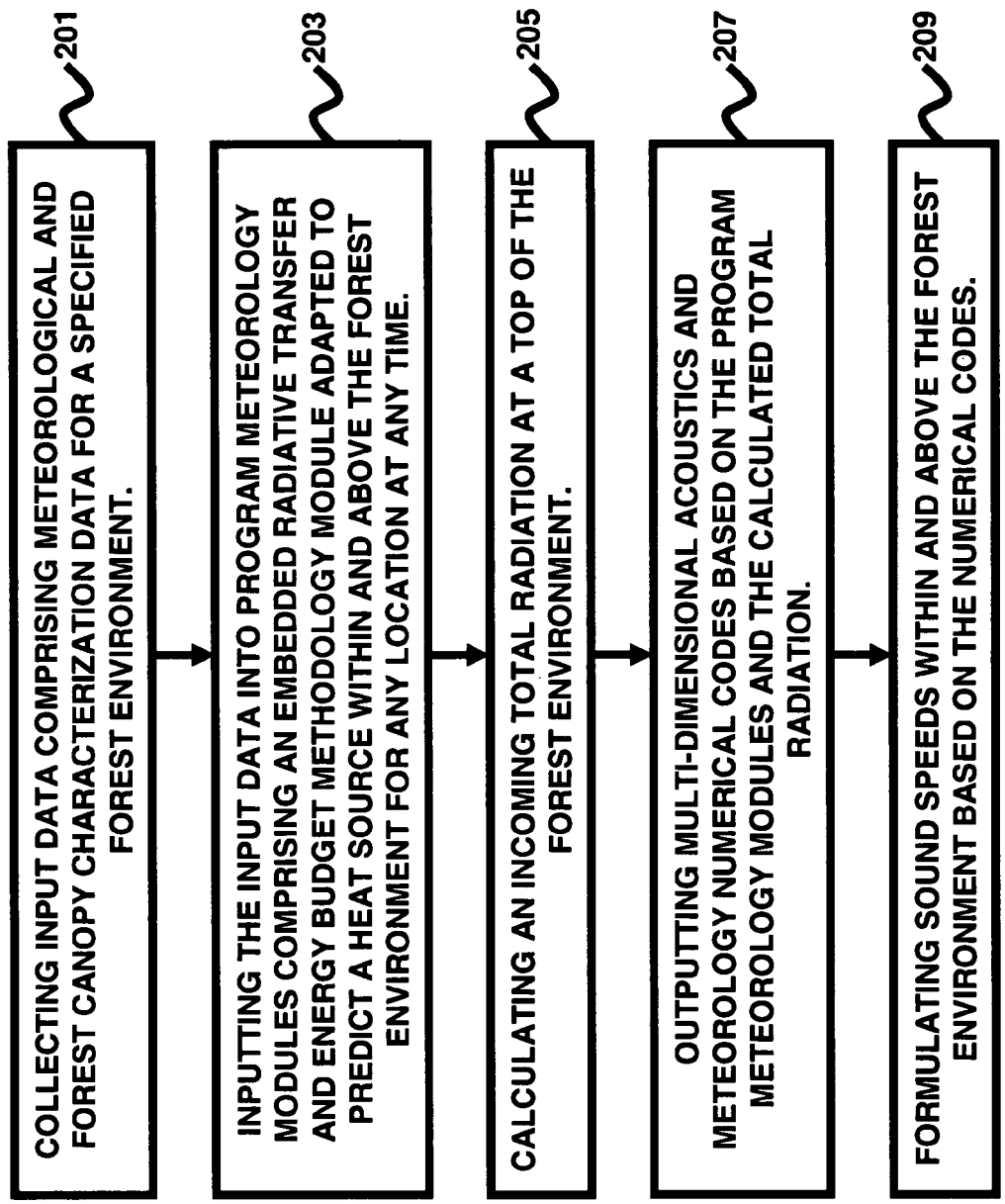
FIG. 20 is a flow diagram illustrating a preferred method according to an embodiment herein.

FIG. 20, with reference to FIGS. 1 through 19, illustrates a flow diagram illustrating a method of predicting multi-dimensional meteorological and acoustic effects within and above a forest environment, wherein the method comprises collecting (201) input data comprising meteorological and forest canopy characterization data for a specified forest environment; inputting (203) the input data into program meteorology modules comprising an embedded radiative transfer and energy budget methodology module adapted to predict a heat source within and above the forest environment for any location at any time; calculating (205) an incoming total radiation at a top of the forest environment; outputting (207) multi-dimensional acoustics and meteorology numerical codes based on the program meteorology modules and the calculated total radiation; and formulating (209) sound speeds within and above the forest environment based on the numerical codes. Preferably, the input data further comprises site location data, cloud cover data, wind speed data, temperature data, humidity data, time of day data, day of year characteristics data, and environment characterization data for the forest environment.

Additionally, the environment characterization data preferably comprises tree height data, leaf area density data, and drag coefficient data affecting the forest environment. Moreover, the embedded radiative transfer and energy budget methodology preferably predicts a heat source within and above the forest environment. Preferably, the calculating of the incoming total radiation at the top of the forest environment allows for calculations of a transmission, reflection, absorption, and emission of a solar flux within the forest environment. Also, the program meteorology modules may comprise acoustic transmission loss modules, acoustic ray path modules, one-dimensional meteorological modules for forest environments, and two-dimensional meteorological modules for forest environments. Preferably, the two-dimensional meteorological modules for the forest environment comprises variable grid modules, and wherein the method further comprises applying the variable grid modules to the acoustic transmission loss modules and the acoustic ray path modules.

The embodiments herein can take the form of an entirely hardware embodiment, an entirely software embodiment or an embodiment including both hardware and software elements. In a preferred embodiment, the embodiments are implemented in software, which includes but is not limited to firmware, resident software, microcode, program modules, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 21:
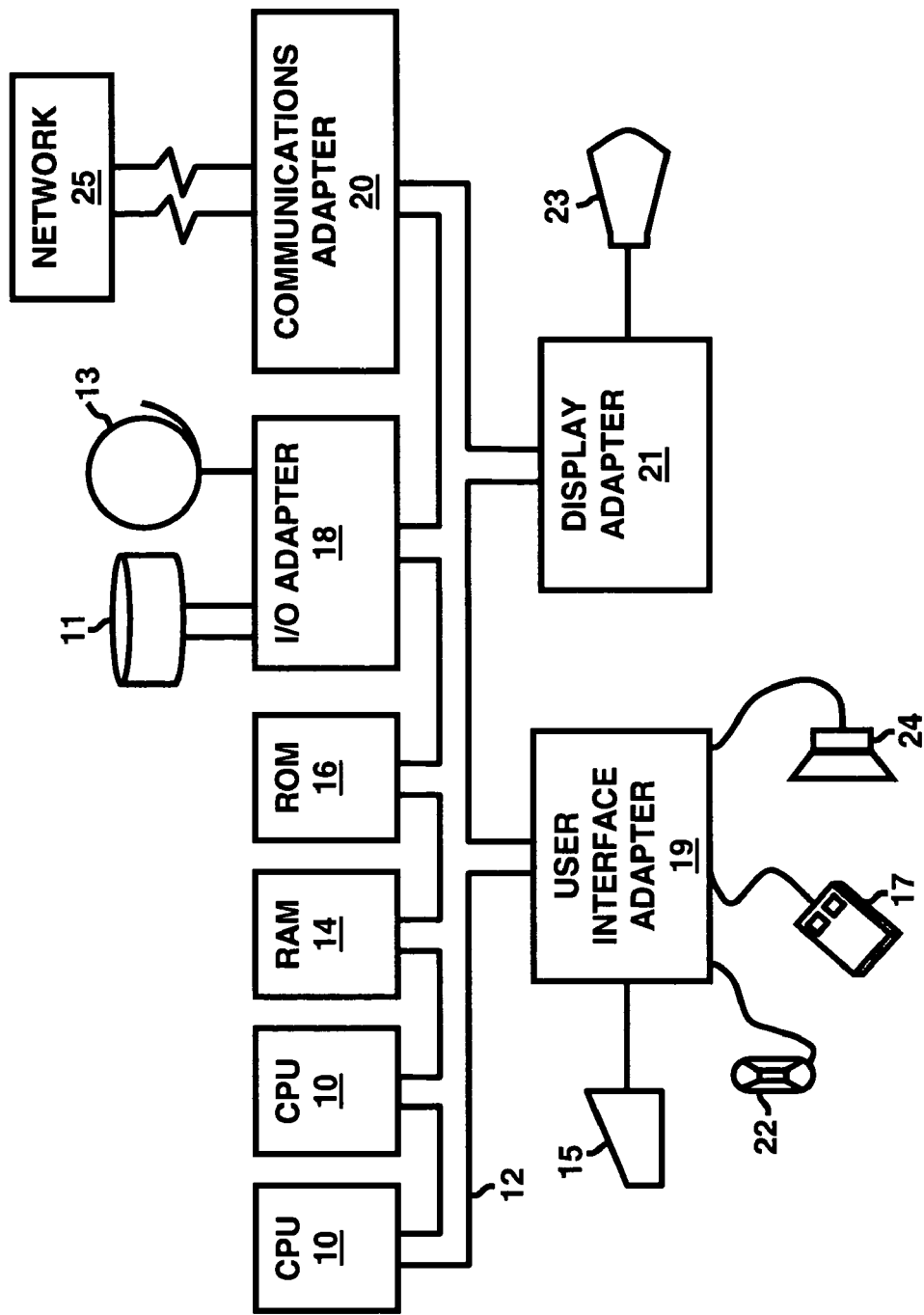
FIG. 21 illustrates a computer system diagram according to an embodiment herein.

A representative hardware environment for practicing the embodiments herein is depicted in FIG. 21. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

An advantage of the embodiments herein is that the acoustic ray path models are based on the principles and theory for geometrical acoustics for an inhomogeneous moving medium. Ray paths are thus computed as a function of range dependent wind and sound speed fields. These data are provided independently from 1D and 2D, physics-based, meteorological model for forests. In addition, acoustic intensity due to geometrical divergence (i.e., energy loss due to spherical spreading) is computed as an inverse function of range and the height difference between two adjacent rays. At the same time, acoustic intensity gain (or loss) due to frequency-dependent ground effects are included in the model calculation.

Furthermore, another advantage of the embodiments herein over the conventional solutions is that the embodiments herein addresses both the thermodynamic and mechanical influences on sound speed within and above forest canopies, wherein the numerical methods provided by the embodiments herein are executed in a computationally efficient framework. Hence, the embodiments herein provide a useful process to obtain rapid predictions of useful acoustic and meteorological information, which can be applied to the study of meteorological aspects of acoustic propagation within and above forests. Some of the conventional techniques are quite computationally intensive. In contrast, the embodiments herein are designed within a computationally efficient and economical framework that allows for a rapid prediction and characterization of complex acoustic environments.

The embodiments herein may be useful in assessing the performance of advanced acoustic sensors and communications as well as determining the effectiveness of battlefield computer aids to increase situational awareness. Moreover, the embodiments herein may be used to perform acoustic signal detection calculations for acoustic sources of interest within and above forest canopies.

Furthermore, the embodiments herein may be utilized in applications studying the effects of forest meteorology on sound blast propagation for noise (blast and artillery noise) abatement studies at military training sites and for performing acoustic signal detection calculations for acoustic sources of interest within and above forest canopies. Furthermore, the embodiments may be utilized in other non-military noise abatement applications such as investigating the effectiveness of forests to reduce traffic and/or airport noise and the like.

Generally, the embodiments herein provide a technique whereby numerical model codes for both meteorology and acoustics reside on a computing device for computationally efficient prediction of useful acoustic and meteorology information within and above uniform and complex forest environments. Furthermore, the technique provided by the embodiments herein include the combination of acoustic transmission loss model codes, acoustic ray path model codes, one-dimensional, physics-based, meteorological model codes for forests, and two-dimensional, physics-based, meteorological model codes for forests. Additionally, the implementation of variable grid in two-dimensional, physics-based, meteorological model codes for forests combined to acoustic transmission loss model codes and acoustic ray path model codes is provided by the embodiments herein.

APPENDIX

Computer program code, which may be used to implement the methodology provided by the embodiments herein, is provided in electronic form and/or CD-ROM. The computer program code, which is written in FORTRAN language, is merely an example of the implementation of the embodiments herein, and those skilled in the art would readily understand that other computer program codes could equally be used in accordance with a programmer's preferred choice, and the embodiments herein are not limited to any particular computer language or code to implement the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of determining the origin and range of a sound event based upon estimates as to how acoustic waves will be attenuated, reflected and transmitted due to multidimensional, nonhomogeneous environmental effects within a predetermined territory, the method comprising:

programming a computer to compute acoustic intensity based upon at least one ray path numerical model which predicts the interaction of the atmosphere and land surface over time; the at least one ray path numerical model comprising ray paths, each ray path being computed as a function of range and time dependent wind and sound speed fields; the acoustic intensity in each ray path being based upon geometrical divergence computed as an inverse function of range and the height difference between at least two rays within a ray path;

inputting into the computer the frequency or frequencies of the acoustic waves to be transmitted from a predetermined location;

inputting into the computer ground-related data concerning absorption, reflection and transmission of acoustic rays by the earth; acoustic intensity gain or loss due to frequency dependent ground effects being computed by the computer;

inputting into the computer radiation intensity data, wind flow velocity data, leaf height and leaf area density data; cloud cover data, temperature data, latitude, longitude, day of year and time of day data;

inputting into the computer, the temperature, humidity, wind and sound speeds as a function of time within and above the predetermined territory;

computing the radiation and energy budget for the predetermined territory based upon incoming radiation and outgoing radiation;

determining the absorption and scattering of acoustical waves by the leaf height and leaf area density data;

determining the mean two-dimensional wind flow, temperature and sound speed in the predetermined territory;

based upon the environmental effects on acoustic waves in a predetermined territory as determined by the at least one ray path numerical model, determining the intensity of acoustic waves propagating from the predetermined territory as a result of at least one sound event emitted within or traveling through the predetermined territory.

2. The method of claim 1, wherein said input data further comprises site location data, and the sound event is created by an armored, tracked vehicle.

3. The method of claim 2, wherein the step of determining the absorption and scattering of acoustical waves includes computing drag coefficient data and wherein the height data comprises tree height data.

4. The method of claim 1, wherein the step of programming a computer to compute acoustic intensity based upon at least one ray path numerical model comprises programming the computer to compute variables comprising the mean flow longitudinal, the mean flow vertical, Reynolds stress, longitudinal, lateral and vertical velocity variances, the mean temperature, vertical heat flux, horizontal heat flux, and the turbulent temperature variance.

5. The method of claim 1, wherein the step of computing, the radiation and energy budget for the vegetated territory based upon incoming radiation and outgoing radiation comprises modeling the heat heat source term ($S_\theta$) as:

$$S_\theta = 2A(\overline{\theta_L(x,y,z,t)} - \overline{\theta_a(x,y,z,t)})/r_h$$

where A (x,y,z)(in units $m^2 m^{-3}$) is the multidimensional leaf area density, $(\overline{\theta_L(x,y,z,t)} - \overline{\theta_a(x,y,z,t)})$ is the multidimensional mean leaf surface-to-ambient-air temperature difference, and $r_h = f(\overline{u(x,y,z,t)})$ is the multidimensional aerodynamic resistance to heat transfer, where u(x,y,z,t) is the multidimensional mean forest canopy layer wind velocity, and the total downward short-wave radiation is:

$$R_{S\downarrow} = I_0 T_R T_G T_W T_A \cos\theta_z$$

where $$I_0 = 1367\left(1 + 0.034\cos\left[\frac{2\pi(n'-1)}{365}\right]\right)$$

is the extraterrestrial solar flux, n' is the day of year, $\theta_z$ is the solar zenith angle, and $T_R$ is Rayleigh scattering, $T_G$ is absorption by permanent gases, $T_W$ is absorption by water vapor, and $T_A$ is absorption and scattering by aerosols particles.

6. The method of claim 1, further comprising the step of outputting numerical output data into a computer memory and graphically displaying the data on a computer display screen.

7. The method of claim 1, wherein the step of programming the computer comprises inputting two-dimensional meteorological modules for forest environments comprising variable grid modules, and wherein said method further comprises applying said variable grid modules to acoustic transmission loss modules and acoustic ray path modules.

8. A program storage device readable by computer, tangibly embodying a program of instructions executable by said computer to perform a method of determining the origin and range of a sound event based upon estimates as to how acoustic waves will be attenuated, reflected and transmitted due to environmental effects within a predetermined territory, the method comprising:

programming a computer to compute acoustic intensity based upon at least one ray path numerical model which predicts the interaction of the atmosphere and land surface over time; the at least one ray path numerical model comprising ray paths, each ray path being computed as a function of range and time dependent wind and sound speed fields; the acoustic intensity in each ray path being based upon geometrical divergence computed as an inverse function of range and the height difference between at least two rays within a ray path;

inputting into the computer the frequency or frequencies of the acoustic waves to be transmitted from a predetermined location;

inputting into the computer ground-related data concerning absorption, reflection and transmission of acoustic rays by the earth; acoustic intensity gain or loss due to frequency dependent ground effects being computed by the computer;

inputting into the computer radiation intensity data, wind flow velocity data, leaf height and leaf area density data; cloud cover data, temperature data, latitude, longitude, day of year and time of day data;

inputting into the computer, the temperature, humidity, wind and sound speeds as a function of time within and above the predetermined territory;

computing the radiation and energy budget for the predetermined territory based upon incoming radiation and outgoing radiation;

determining the absorption and scattering of acoustical waves by the height and leaf area density data;

determining the mean two-dimensional wind flow, temperature and sound speed in the predetermined territory;

based upon the environmental effects on acoustic waves in a predetermined territory as determined by the at least one ray path numerical model, determining the intensity of acoustic waves propagating from the predetermined territory as a result of at least one sound event emitted within or traveling through the predetermined territory.

9. The program storage device of claim 8, wherein the at least one sound event comprises at least one weapons blast and wherein the program storage device is used to determine the effects of the at least one weapons blast on the surrounding environment and to determine noise abatement effectiveness.

10. The program storage device of claim 9, wherein the step of determining the absorption and scattering of acoustical waves includes computing drag coefficient data and wherein the leaf height data comprises tree height data.

11. The program storage device of claim 8, wherein the step of programming a computer to compute acoustic intensity based upon at least one ray path numerical model comprises programming the computer to compute variables comprising the mean flow longitudinal, the mean flow vertical, Reynolds stress, longitudinal, lateral and vertical velocity variances, the mean temperature, vertical heat flux, horizontal heat flux, and the turbulent temperature variance.

12. The program storage device of claim 8, wherein the step of computing, the radiation and energy budget for the vegetated territory based upon incoming radiation and outgoing radiation comprises modeling the heat source term ($S_\theta$) as:

$$S_\theta = 2A(\overline{\theta_L(x,y,z,t)} - \overline{\theta_a(x,y,z,t)})/r_h$$

where A(x,y,z) (in units $m^2 m^{-3}$) is the multidimensional leaf area density, $\overline{\theta_L(x,y,z,t)} - \overline{\theta_a(x,y,z,t)}$ is the multidimensional mean leaf surface-to-ambient-air temperature difference, and $r_h = f(\overline{u(x,y,z,t)})$ is the multidimensional aerodynamic resistance to heat transfer, where u(x,y,z,t) is the multidimensional mean forest canopy layer wind velocity, and the total downward short-wave radiation is:

$$R_{S\downarrow} = I_0 T_R T_G T_W T_A \cos\theta_z$$

where $$I_0 = 1367\left(1 + 0.034 \cos\left[\frac{2\pi(n'-1)}{365}\right]\right)$$

is the extraterrestrial solar flux, n' is the day of year, $\theta_z$ is the solar zenith angle, and $T_R$ is Rayleigh scattering, $T_G$ is absorption by permanent gases, $T_W$ is absorption by water vapor, and $T_A$ is absorption and scattering by aerosols particles.

13. The program storage device of claim 8, further comprising the step of determining the effects on transmission of acoustic waves by interference between direct and ground reflected acoustic waves and scattering by tree trunks and branches, the ground and air turbulence, and absorption by trees, leaves, branches, the ground and air; and further comprising the step of outputting numerical output data into a computer memory and graphically displaying the data on a computer display screen.

14. The program storage device of claim 13, wherein the step of programming the computer comprises inputting two-dimensional meteorological modules for forest environments comprising variable grid modules, and wherein said method further comprises applying said variable grid modules to acoustic transmission loss modules and acoustic ray path modules.

15. A system for determining the origin and range of a sound event based upon estimates as to how acoustic waves will be attenuated, reflected and transmitted due to environmental effects within a predetermined territory, said system comprising:

a computer memory device comprising programming to compute acoustic intensity based upon at least one ray path numerical model which predicts the interaction of the atmosphere and land surface over time; the at least one ray path numerical model comprising ray paths, each ray path being computed as a function of range and time dependent wind and sound speed fields; the acoustic intensity in each ray path being based upon geometrical divergence computed as an inverse function of range and the height difference between at least two rays within a ray path; the computer memory device adapted for inputting into the computer:

(a) the frequency or frequencies of the acoustic waves to be transmitted from a predetermined location;

(b) ground-related data concerning absorption, reflection and transmission of acoustic rays by the earth; acoustic intensity gain or loss due to frequency dependent ground effects being computed by the computer;

(c) radiation intensity data, wind flow velocity data, leaf height and leaf area density data; cloud cover data, temperature data, latitude, longitude, day of year and time of day data;

(d) humidity data, wind data and sound speed data as a function of time within and above the predetermined territory;

a processor operatively connected to said computer memory device for computing the radiation and energy budget for the predetermined territory based upon incoming radiation and outgoing radiation; the processor determining the absorption and scattering of acoustical waves by the leaf height and leaf area density data; the processor determining the mean two-dimensional wind flow, temperature and sound speed in the predetermined territory; and based upon the environmental effects on acoustic waves in a predetermined territory as determined by the at least one ray path numerical model, determining the intensity of acoustic waves propagating from the predetermined territory as a result of at least one sound event emitted within or traveling through the predetermined territory; and a graphic user interface operatively connected to said processor, wherein said graphic user interface is adapted to display said acoustic speeds within and above said predetermined territory.

16. The system of claim 15, wherein the computer memory device is further adapted for inputting into the computer site location data, cloud cover data, wind speed data, temperature data, humidity data, time of day data, day of year characteristics data.

17. The system of claim 16, wherein computer memory device is further adapted for inputting into the computer environment characterization data comprises tree height data, leaf area density data, and drag coefficient data affecting said predetermined territory.

18. The system of claim 15, wherein the computer memory further comprises programming to compute variables comprising the mean flow longitudinal, the mean flow vertical, Reynolds stress, longitudinal, lateral and vertical velocity variances, the mean temperature, vertical heat flux, horizontal heat flux, and the turbulent temperature variance.

19. The system of claim 15, wherein said processor is adapted to calculate a transmission, reflection, absorption, and emission of a solar flux through said forest environment.

20. The system of claim 15, wherein said computer memory comprises program meteorology modules comprise acoustic transmission loss modules, acoustic ray path modules, one-dimensional meteorological modules for forest environments, and two-dimensional meteorological modules for said forest environments.

21. The system of claim 20, wherein said two-dimensional meteorological modules for said forest environments comprises variable grid modules, and wherein said program meteorology modules further comprise program modules adapted to apply said variable grid modules to said acoustic transmission loss modules and said acoustic ray path modules.

* * * * *